US012681647B2

(12) United States Patent
Li et al.

(10) Patent No.: US 12,681,647 B2
(45) Date of Patent: Jul. 14, 2026

(54) CONTAINER STORAGE MANAGEMENT METHOD AND APPARATUS

(71) Applicant: HUAWEI TECHNOLOGIES CO., LTD., Shenzhen (CN)

(72) Inventors: Ming Li, Xi'an (CN); Xiaokang He, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/901,434

(22) Filed: Sep. 30, 2024

(65) Prior Publication Data

US 2025/0021241 A1 Jan. 16, 2025

Related U.S. Application Data

(63) Continuation of application No. PCT/CN2023/076399, filed on Feb. 16, 2023.

(30) Foreign Application Priority Data

| Apr. 1, 2022 | (CN) | .......................... | 202210347198.5 |
| Jun. 27, 2022 | (CN) | .......................... | 202210736549.1 |

(51) Int. Cl.
*G06F 12/00* (2006.01)
*G06F 3/06* (2006.01)

(52) U.S. Cl.
CPC .......... *G06F 3/0619* (2013.01); *G06F 3/0635* (2013.01); *G06F 3/067* (2013.01)

(58) Field of Classification Search
None
See application file for complete search history.

(56) References Cited

U.S. PATENT DOCUMENTS

| 8,751,711 B2 * | 6/2014 | Anantha Padmanaban ................. H04L 67/1097 710/15 |
| 9,600,376 B1 | 3/2017 | Krinke, II et al. |
| 2020/0264930 A1 | 8/2020 | Mandagere et al. |

FOREIGN PATENT DOCUMENTS

| CN | 113312174 A | 8/2021 |
| CN | 113672350 A | 11/2021 |

OTHER PUBLICATIONS

GitHub.com [online], "Documentation Kubernetes—Concepts," Sep. 5, 2020, retrieved on Sep. 6, 2020, retrieved from URL <https://github.com/dohsimpson/kubernetes-doc-pdf/raw/a5a0a15050249de56fcadd332840dd5932219ad9/PDFs/Concepts.pdf>, 618 pages.

(Continued)

*Primary Examiner* — Daniel D Tsui

(74) *Attorney, Agent, or Firm* — Fish & Richardson P.C.

(57) ABSTRACT

This application relates to container storage management methods and apparatuses. An example method is used to manage a containerized application. The containerized application is deployed in a first container cluster. The first container cluster includes a plurality of nodes. The method includes collecting a plurality of pieces of storage association information from the plurality of nodes. The storage association information is information related to data storage of the containerized application. The method further includes summarizing the plurality of pieces of storage association information to obtain a storage topology of the containerized application. The storage topology of the containerized application includes an association between an element of the containerized application and a physical storage location of the containerized application.

20 Claims, 13 Drawing Sheets

(56) References Cited

OTHER PUBLICATIONS

Kubernetes.io [online], "Administer a Cluster," available on or before Apr. 22, 2021, via Internet Archive: Wayback Machine URL <https://web.archive.org/web/20220322032645/https://kubernetes.io/docs/tasks/administer-cluster/_print/>, 103 pages.

Extended European Search Report in European Appln. No. 23777679.4, mailed on Apr. 3, 2025, 16 pages.

International Search Report and Written Opinion in International Appln. No. PCT/CN2023/076399, mailed on Apr. 12, 2023, 10 pages (with partial English translation).

* cited by examiner

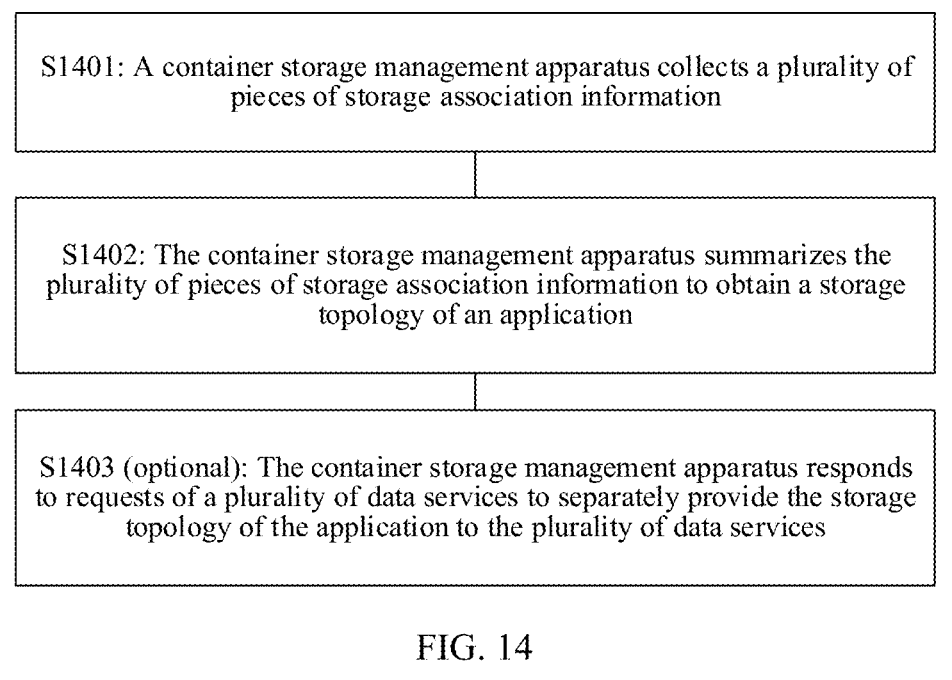

S1401: A container storage management apparatus collects a plurality of pieces of storage association information S1402: The container storage management apparatus summarizes the plurality of pieces of storage association information to obtain a storage topology of an application S1403 (optional): The container storage management apparatus responds to requests of a plurality of data services to separately provide the storage topology of the application to the plurality of data services

FIG. 14

CONTAINER STORAGE MANAGEMENT METHOD AND APPARATUS

CROSS-REFERENCE TO RELATED APPLICATIONS

This application is a continuation of International Application No. PCT/CN2023/076399, filed on Feb. 16, 2023, which claims priority to Chinese Patent Application No. 202210736549.1, filed on Jun. 27, 2022, and Chinese Patent Application No. 202210347198.5, filed on Apr. 1, 2022. All of the aforementioned patent applications are hereby incorporated by reference in their entireties.

TECHNICAL FIELD

This application relates to the field of information technologies (IT) and container technologies, and in particular, to a container storage management method and apparatus.

BACKGROUND

As the container technology gradually becomes new standard infrastructure in the cloud computing field, increasingly more users deploy applications in a container cluster. When the applications are deployed in the container cluster, a plurality of types of data are generated. As a means of improving competitiveness, container vendors are actively developing various application-oriented data services when providing infrastructure of the container cluster, so that users can obtain more assurance when using the container cluster. Common data services include backup, disaster recovery, migration, data security, or the like.

When a data service is implemented, data of an application usually needs to be obtained. However, different types of data may be stored in different locations, that is, each data service may need to obtain corresponding data from a different location. This makes efficiency of the data service unsatisfactory. In addition, the container cluster involves a large quantity of objects, has complex structures, and has a large quantity of types of storage devices for storing data, aggravating problems of low efficiency and instability of the data service, and affecting user experience.

Therefore, how to obtain data conveniently and efficiently for a data service is a problem to be urgently resolved by a person skilled in the art.

SUMMARY

Embodiments of this application provide a container storage management method and apparatus, to manage a storage topology of an application, and improve service efficiency and reliability of a data service.

According to a first aspect, an embodiment of this application provides a container storage management method. The method includes:

collecting a plurality of pieces of storage association information from a plurality of nodes, where the storage association information is information related to data storage of an application;

summarizing the plurality of pieces of storage association information to obtain a storage topology of the application, where the storage topology of the application includes an association between an element of the application and a physical storage location of the application, the physical storage location is a location at which a first storage device stores data of the application, and the first storage device is connected to the first container cluster; and responding to requests of a plurality of data services to separately provide the storage topology of the application to the plurality of data services.

In this embodiment of this application, the storage association information of the application can be collected, and the plurality of pieces of storage association information are summarized to obtain the storage topology of the application, to centrally manage and maintain storage topologies of applications, thereby meeting a requirement of the data service for sensing the storage topology.

Further, the storage topology can be provided for the data service. In this way, in one aspect, in a development or running process, an upper-layer data service can conveniently and quickly obtain a storage topology of a required application, and does not need to obtain different storage information from a plurality of places or summarize the storage information to obtain the storage topology, so that a development and running process of each data service is simpler and more efficient, and an error is not likely to occur, thereby improving service efficiency and quality of service of the data service. On the other hand, in this embodiment of this application, an apparatus can centrally obtain and maintain of storage topologies of applications, and each service does not need to perform such process, thereby avoiding repeated work of each data service, and further reducing consumption of computing resources in the container cluster.

Optionally, the application may be an application deployed in the container cluster. In this case, the application is also referred to as a containerized application. The method provided in this embodiment of this application may be used to manage the containerized application.

In a possible implementation of the first aspect, the container cluster is a Kubernetes® cluster, and the plurality of nodes include a master Master and a node Node. Further, service load of the containerized application is implemented by the Node, and the service load of the containerized application is scheduled to the Node by the Master.

Optionally, some container clusters further provide an operation and maintenance node, configured to maintain application running. In this case, the plurality of nodes further include the operation and maintenance node.

In still another possible implementation of the first aspect, the collecting, summarizing, and responding steps are performed by a container storage management apparatus deployed in the first container cluster, the container storage management apparatus further provides a service interface, and the responding step specifically includes:

responding to invoking of the service interface by the plurality of data services to separately provide a storage topology of the containerized application for the plurality of data services.

In still another possible implementation of the first aspect, the storage topology of the containerized application is used by the plurality of data services to implement migration, backup, active-active, disaster recovery, or the like of the containerized application.

In still another possible implementation of the first aspect, the container storage management apparatus includes a collection module and a storage relationship management module. The function of collecting the storage association information is implemented by the collection module, and the function of summarizing the storage association information is implemented by the storage relationship management module.

In the foregoing implementation, a plurality of collection modules collect storage association information at a plurality of collection points (locations at which the collection modules are deployed are referred to as collection points). Correspondingly, the storage relationship management module may summarize the plurality of pieces of storage association information, and generate the storage topology of the application based on the storage association information. Therefore, in a process of generating the storage topology, data does not need to be repeatedly sorted, and the storage topology of the application can be quickly and accurately generated in this embodiment of this application.

In addition, when the collection modules are deployed at the plurality of collection points, and the storage association information at the collection points change, the storage relationship management module may obtain a changed and updated storage topology in a timely manner, thereby improving accuracy of the storage topology and improving reliability of the data service.

Optionally, the collection module may be deployed on an apparatus related to the containerized application. For example, the collection module may be deployed on one or more apparatuses of the Node, the Master, or the operation and maintenance node.

In a possible design, the storage association information may be obtained from a database on the node. For example, the database may include an operation and maintenance database, a storage database, an ECTD database, and the like. The database is usually deployed on the node, or the node has a database proxy.

In still another possible implementation of the first aspect, the storage association information includes a correspondence between the application and a volume.

In still another possible implementation of the first aspect, the storage association information includes a correspondence between a volume used by the application and the physical storage location.

In the foregoing implementation, the collection point may collect a relationship between elements in the containerized application, and does not need to care about an overall topology structure of the containerized application. In this way, workload of the collection point is low, and computing resources are not be excessively occupied, so that a large collection range can be covered, and system stability is facilitated.

A persistent volume is a volume that can store data persistently. If a storage space allocated to a container in the Node is the persistent volume, after the container is destroyed or deleted, data stored in the persistent volume may be further retained. In the container cluster, when a PV is used, a persistent volume claim (PVC) and/or a storage class (SC) need/needs to be defined.

In still another possible implementation of the first aspect, the correspondence between the application and the volume includes one or more of the following:

a PV corresponding to a PVC defined by the application, an SC corresponding to the PVC, and an SC corresponding to the PV.

A correspondence between the application and the persistent volume is reflected in the storage topology, so that a requirement for sensing persistent data can be implemented. Even after the container is deleted, the data service can still obtain data already generated by the containerized application, thereby improving reliability of the data service.

In still another possible implementation of the first aspect, the physical storage location includes one or more of the following:

a logical unit number, a disk array identifier, a disk identifier, a file system directory, a logical volume identifier, or the like.

In still another possible implementation of the first aspect, the application is deployed in the first container cluster, and the method further includes:

synchronizing the storage topology of the application to a second container cluster.

The synchronization may be periodic synchronization, or may be non-periodic synchronization. For example, the storage topology is synchronized to the second container cluster when being updated. In this case, the second container cluster can quickly sense the storage topology of the application, so that the application can be reconstructed or a topology of a backup application can be adjusted in the second container cluster, thereby improving reliability of the data service.

In still another possible implementation of the first aspect, the storage topology of the containerized application is used by the data service to implement migration, backup, active-active, disaster recovery, or the like of the containerized application in the second container cluster.

In still another possible implementation of the first aspect:

the container storage management apparatus further provides a first interface, and the first interface is configured to invoke a storage function provided by the first storage device.

In some scenarios, a storage device vendor provides a series of storage functions (or referred to as storage features) on the storage device, for example, compression, deduplication, replication, and backup. Because different storage devices provide different storage functions, if the data service invokes the storage function through a private interface, additional compatibility code may need to be developed, thereby affecting efficiency and reliability of the data service. The first interface in this embodiment of this application implements unified invoking of the different storage functions. The data service can fully use an underlying storage capability to orchestrate, place, replicate, and the like the data of the containerized application through the first interface, thereby improving stability and reliability of the data service and improving user experience.

Optionally, the first interface may be implemented in an application programming interface (API) manner.

In still another possible implementation of the first aspect, the storage function includes a high-speed storage link, and the high-speed storage link is used to transmit the data of the application.

In still another possible implementation of the first aspect, the high-speed storage link is used by data services such as migration, backup, or active-active to transmit the data of the containerized application.

The high-speed storage link is a storage function, and is a data link that can establish high-speed transmission between underlying data storage, to implement a high-speed transmission requirement of the data. According to this embodiment of this application, the data service can invoke the high-speed storage link, to conveniently and efficiently migrate the data of the containerized application, thereby improving quality of service and reliability of the data service and improving user experience.

In still another possible implementation of the first aspect, the storage function provided by the first storage device includes a high-speed storage link, and the method further includes:

responding to invoking of the first interface by any one of the plurality of data services to indicate the first storage device to transmit the data of the containerized application to a second storage device through the high-speed storage link.

Optionally, the first storage device may be a storage device connected to the first container cluster.

In still another possible implementation of the first aspect, the plurality of data services include a first data service, the first data service includes a first sub-service, the first sub-service is located in a second container cluster, and the method further includes:

reconstructing, by the first sub-service, the application in the second container cluster based on the storage topology of the application and the data that is of the application and that is stored in the second storage device, where the second storage device is connected to the second container cluster.

In still another possible implementation of the first aspect, the method further includes: synchronizing the storage topology of the containerized application to the second container cluster; and obtaining, by the first sub-service, the storage topology of the containerized application from the second container cluster.

In still another possible implementation of the first aspect, the first data service further includes a second sub-service, the second sub-service is located in the first container cluster, and the method further includes:

invoking, by the second sub-service, the service interface to obtain the storage topology of the containerized application; and synchronizing, by the second sub-service, the storage topology of the containerized application to the first sub-service.

According to a second aspect, an embodiment of this application provides a container storage management apparatus. The container storage management apparatus is configured to manage an application, the application is deployed in a first container cluster, the first container cluster includes a plurality of nodes, and the container storage management apparatus is configured to implement the method described in any one of the first aspect or the possible implementations of the first aspect.

Optionally, the application is a containerized application.

In a possible implementation of the second aspect, the container storage management apparatus includes a storage relationship management module and a plurality of collection modules.

The plurality of collection modules are configured to collect a plurality of pieces of storage association information from the plurality of nodes, where the storage association information is information related to data storage of the containerized application.

The storage relationship management module is configured to summarize the plurality of pieces of storage association information to obtain a storage topology of the containerized application, where the storage topology of the containerized application includes an association between an element of the containerized application and a physical storage location of the containerized application, the physical storage location is a location at which a first storage device stores data of the containerized application, and the first storage device is connected to the first container cluster.

The storage relationship management module is further configured to respond to requests of a plurality of data services to separately provide the storage topology of the containerized application to the plurality of data services.

In still another possible implementation of the second aspect, the storage relationship management module is further configured to:

respond to invoking of the service interface by the plurality of data services to separately provide the storage topology of the containerized application for the plurality of data services.

In still another possible implementation of the second aspect, the storage topology of the containerized application is used by the plurality of data services to implement migration, backup, active-active, disaster recovery, or the like of the containerized application.

In still another possible implementation of the second aspect, the storage association information includes a correspondence between the application and a volume.

In still another possible implementation of the second aspect, the storage association information includes a correspondence between a volume used by the application and the physical storage location.

In still another possible implementation of the second aspect, the correspondence between the application and the volume includes one or more of the following:

a PV corresponding to a PVC defined by the application, an SC corresponding to the PVC, and an SC corresponding to the PV.

In still another possible implementation of the second aspect, the physical storage location includes one or more of the following information:

a logical unit number, a disk array identifier, a disk identifier, a file system directory, a logical volume identifier, or the like.

In still another possible implementation of the second aspect, the storage relationship management module is further configured to:

synchronize the storage topology of the containerized application to a second container cluster, where the storage topology of the containerized application is used to implement migration, backup, active-active, disaster recovery, or the like of the containerized application in the second container cluster.

In still another possible implementation of the second aspect, the container storage management apparatus further provides a first interface, and the first interface is configured to invoke a storage function provided by the first storage device.

In still another possible implementation of the second aspect, the container storage management apparatus further includes a storage function driver module, and the first interface is provided by the container function driver module.

In still another possible implementation of the second aspect, the storage function includes a high-speed storage link, and the container storage management apparatus is further configured to:

respond to invoking of the first interface by any one of the plurality of data services to indicate the first storage device to transmit the data of the containerized application to a second storage device through the high-speed storage link.

In still another possible implementation of the second aspect, the first container cluster is a Kubernetes® cluster.

Further, the plurality of nodes include a master Master and a node Node.

In still another possible implementation of the second aspect, the second container cluster is a Kubernetes® cluster.

According to a third aspect, an embodiment of this application provides a service providing system. The container service providing system includes a first container storage management apparatus, the service providing system further provides a plurality of data services, and the plurality of data services include a first data service. The first container storage management apparatus is the storage management apparatus described in any one of the second aspect or the possible implementations of the second aspect, and the service providing system is configured to implement the method described in any one of the first aspect or the possible implementations of the first aspect.

In a possible implementation of the third aspect, the first container storage management apparatus is located in a first container cluster, and an application is deployed in the first container cluster.

The first data service includes a first sub-service and a second sub-service, the first sub-service is located in a second container cluster, and the second sub-service is located in the first container cluster.

The first sub-service is configured to reconstruct the application in the second container cluster based on a storage topology of the application and data that is of the application and that is stored in a second storage device, where the second storage device is connected to the second container cluster.

In the foregoing implementation, the first container storage management apparatus centrally manages storage topologies of applications in the first container cluster, and the data service may obtain the storage topology of the application by invoking a service interface, so that a development, maintenance, and running process of an upper-layer data service is simpler, an error probability is reduced, and reliability is improved. In addition, storage collected by the container storage management apparatus is collected in real time by the background. Therefore, the data service can quickly obtain the storage topology of the application by using the container storage management apparatus, efficiency is higher, and accuracy of the storage topology is higher.

In a possible implementation of the third aspect, the first container storage management apparatus is further configured to synchronize the storage topology of the application to a second container storage management apparatus in the second container cluster.

The first sub-service is further configured to invoke a service interface provided by the second container storage management apparatus to obtain the storage topology of the application.

In a possible implementation of the third aspect, the first data service further includes a second sub-service, and the second sub-service is located in the first container cluster.

The second sub-service is configured to invoke a service interface provided by the first container storage management apparatus to obtain the storage topology of the containerized application, and synchronize the storage topology of the containerized application to the first sub-service.

According to a fourth aspect, an embodiment of this application provides a service providing system. The container service providing system includes a first container cluster, the first container cluster includes a plurality of first nodes, and a containerized application is deployed in the first container cluster. The first container cluster stores first computer programs or instructions, and the first computer programs or instructions are loaded and executed by the first node, so that the first container cluster performs the container storage management method in any one of the first aspect or the possible implementations of the first aspect.

In a possible implementation of the fourth aspect, the system further includes a second container cluster, and the second container cluster includes a plurality of second nodes. The second container cluster stores second computer programs or instructions, and the second computer programs or instructions are loaded and executed by the second node, so that the second container cluster performs the method performed by the first sub-service in any one of the first aspect or the possible implementations of the first aspect.

When the first computer programs or instructions are loaded and executed by the first node, the first container cluster further performs the method performed by the first container storage management apparatus and performed by the second sub-service in the data service in any one of the first aspect or the possible implementations of the first aspect.

According to a fifth aspect, an embodiment of this application further provides a storage relationship management apparatus. The storage relationship management apparatus includes a storage relationship management module. The storage relationship management module is configured to implement some functions of the storage relationship management apparatus provided in any one of the second aspect, for example, configured to implement one or more functions of summarizing storage association information, obtaining a storage topology, or providing a service interface. For details, refer to the description in the foregoing embodiment.

Optionally, the storage relationship management module may include a communication unit and a processing unit. The communication unit is configured to receive and/or send data, and/or the communication unit is configured to provide input and/or output for the processing unit. The processing unit is configured to implement functions such as processing, generating, and calculating.

According to a sixth aspect, an embodiment of this application further provides a collection apparatus. The collection apparatus includes a collection module. The collection module is configured to implement some functions of the storage relationship management apparatus provided in any one of the second aspect, for example, configured to implement one or more functions of collecting association information, reporting storage association information, or the like. For details, refer to the description in the foregoing embodiment.

Optionally, the collection module may include a collection unit and a communication unit. The collection unit is configured to collect data. The communication unit is configured to receive and/or send data (for example, implement a function of reporting storage association information), and/or the communication unit is configured to provide input and/or output for the processing unit. Optionally, the collection module further includes a processing unit. The processing unit is configured to preprocess the collected data and the like.

According to a seventh aspect, an embodiment of this application provides a computing device. The computing device includes a processor and a memory. The processor executes instructions stored in the memory, so that the computing device implements the method described in any one of the first aspect.

Optionally, the computing device further includes a communication interface. The communication interface is configured to receive and/or send data, and/or the communication interface is configured to provide input and/or output for the processor.

It should be noted that the foregoing embodiment is described by using an example in which the processor (or referred to as a general-purpose processor) that executes the method by invoking computer instructions is used. In a specific implementation process, the processor may alternatively be a dedicated processor. In this case, the computer instructions have been pre-loaded in the processor. Optionally, the processor may further include both a dedicated processor and a general-purpose processor.

Optionally, the processor and the memory may be further integrated into one component, that is, the processor and the memory may be further integrated together.

According to an eighth aspect, an embodiment of this application further provides a computing device cluster. The computing device cluster includes at least one computing device, and each computing device includes a processor and a memory.

The processor of the at least one computing device is configured to execute instructions stored in the memory of the at least one computing device, so that the computing device cluster performs the method according to any one of the first aspect.

According to a ninth aspect, an embodiment of this application provides a computer-readable storage medium. The computer-readable storage medium stores instructions. When the instructions are run on at least one processor, the method described in any one of the first aspect is implemented.

According to a tenth aspect, this application provides a computer program product. The computer program product includes computer instructions. When the instructions are run on at least one processor, the method described in any one of the first aspect is implemented.

Optionally, the computer program product may be a software installation package or an image package. When the foregoing method needs to be used, the computer program product may be downloaded, and the computer program product may be executed on the computing device.

For beneficial effects of the technical solutions provided in the second to the tenth aspects of this application, refer to beneficial effects of the technical solution in the first aspect. Details are not described herein again.

BRIEF DESCRIPTION OF DRAWINGS

The following briefly describes accompanying drawings used in describing embodiments.

FIG. 14 is a schematic flowchart of a container storage management method according to an embodiment of this application;

DESCRIPTION OF EMBODIMENTS

The following describes embodiments of this application in detail with reference to accompanying drawings.

For ease of understanding, some concepts related to embodiments of this application are described for reference by using examples below. The concepts are as follows:

1. Container technology: is a virtualization technology that can isolate processes and resources.

2. Kubernetes®: also referred to as K8s, is an open-source container cluster (or container cluster operating system). It is responsible for deployment, scaling, and management of an application. The deployment, scaling, and management of the application provided by Kubernetes® are implemented based on containers. Embodiments of the present invention may be applied to a cluster of K8s or another containerized application.

Figure 1:
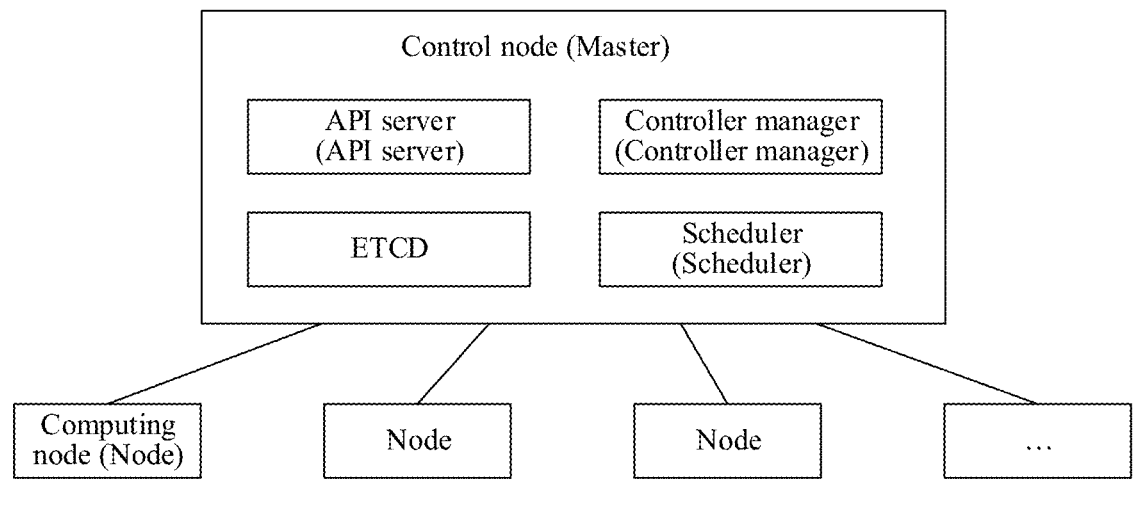
FIG. 1 is a schematic diagram of an architecture of Kubernetes®.

FIG. 1 is a schematic diagram of an architecture of Kubernetes, including a Master (or referred to as a master node or a control node) and a Node (or referred to as a computing node or an operating node).

The Master is the control node in the cluster, and includes four components: an application programming interface (API) server, a scheduler, a controller manager, and an ETCD. The ETCD is a distributed data storage component, also referred to as an ETCD database, and is responsible for storing configuration information of the cluster.

The Node is the computing node in the cluster and is a node that runs a containerized application. Service load of the application is run on the Node in a form of pod. One pod can run one or more containers. The service load may be considered as a functional unit of the application, and is configured to implement one or more services.

Alternatively, for a definition of the service load, refer to a definition in the conventional technology.

In some embodiments of this application, an application deployed in a container cluster is referred to as a containerized application. It should be understood that this application is described by using a K8s container cluster, and embodiments of this application are not limited to being used in the K8s container cluster.

For example, embodiments of this application may be further used in a container cluster of another architecture.

For another example, embodiments of this application may also be used to manage an application deployed in another computing instance (including a virtual machine, a container, a bare metal server, or the like) cluster. For example, the application in embodiments of this application may be deployed in a cluster including a plurality of virtual machines.

3. Objects in Kubernetes

A function of an application deployed in a container cluster is implemented through a Kubernetes object. The following describes some Kubernetes objects by using examples.

A pod is a scheduling unit and a resource unit of Kubernetes. One or more containers are encapsulated in one pod. The pod is created through an API server. After the pod is created, a Master needs to schedule the created pod to a Node for running.

Deployment is a service-oriented encapsulation for the pod. The deployment can include one or more pods. Generally, the pods included in the deployment have a same role. Therefore, a system automatically distributes requests to the plurality of pods in the deployment.

A StatefulSet (or referred to as a state set) is a Kubernetes object used to manage a stateful application. The StatefulSet manages a group of pods defined based on a same container. This group of pods are created based on a same claim, but cannot be replaced with each other. The StatefulSet maintains a fixed identification (ID) for each pod to distinguish a different pod.

A DaemonSet (also referred to as a daemon process set) is a daemon process. It can run one pod on a node, and the pod is used to implement some management-type processes, such as log collection and resource monitoring.

The foregoing objects are some possible objects listed for ease of understanding the Kubernetes objects. This application is also applicable to a scenario in which more or fewer Kubernetes objects are included.

4. Storage Resource

Kubernetes storage is managed by a volume. The volume can claim a storage resource that can be accessed. One volume can be mounted to a pod or a specified path of one or more containers.

The volume is classified into local disk storage and cloud storage (or network storage).

The following describes the local storage. The local disk storage may include an empty directory (emptyDir), a host address (HostPath), a configuration file (ConfigMap), a security-related file (Secret), and the like. The emptyDir is a volume type and is used for temporary storage. Its lifecycle is the same as that of a pod. After the pod is deleted, data of the volume is also deleted. The mounted volume of the emptyDir type is an empty directory. The container or pod reads and writes a file in the emptyDir.

The HostPath is persistent storage provided by a node. If a pod using the HostPath is deleted, content in the HostPath still exists in the node. If a new pod is created and scheduled to the same node, the new pod can still read the content written by the former pod after the HostPath is mounted to the pod.

The configuration file ConfigMap and security-related security secret are special volume types, and may also be considered as configuration information of the application.

The cloud storage includes but is not limited to block storage, file storage, and object storage. For example, the block storage includes but is not limited to a storage area network (SAN), an elastic volume service (EVS), and the like. The file storage includes but is not limited to network attached storage (NAS), a scalable file service (SFS), or efficient file storage SFS Turbo. The object storage includes but is not limited to an object storage service (OBS), and the like.

During use, the local storage can be directly mounted to the pod or container. The cloud storage can be used through a persistent storage volume (PV) and a persistent volume claim (PVC). Certainly, in some scenarios, the local storage may also be used through the PV and the PVC.

5. PV and PVC

Kubernetes abstracts the PV and the PVC to define and use a storage resource, so that a user does not need to care about specific infrastructure. When the storage resource is required, only a number of required resources needs to be claimed, like a CPU and a memory. The PV belongs to a cluster-level resource. The PVC is a claim for the storage resource. The PVC needs to describe an attribute of a requested storage resource, for example, a storage size and read/write permission.

Figure 2:
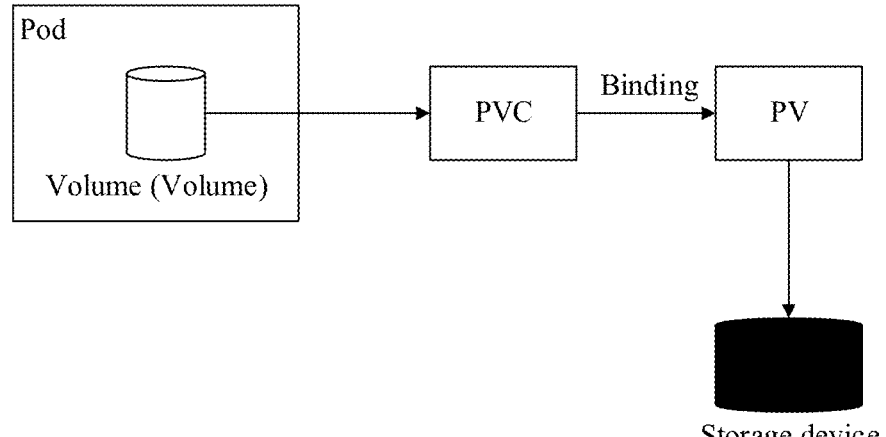
FIG. 2 is a schematic diagram of a relationship between a storage resource, a PV, and a PVC.

The PVC consumes the PV resource. FIG. 2 shows an example of a relationship between a storage resource, a PV, and a PVC. A storage space provided by the PV is provided by a storage device. When the storage resource needs to be used, only the PVC needs to be created, and a volume is used to associate with the PVC in a pod. The PVC is bound to the PV. Therefore, the pod can use the storage space provided by the PV through the PVC.

Figure 3:
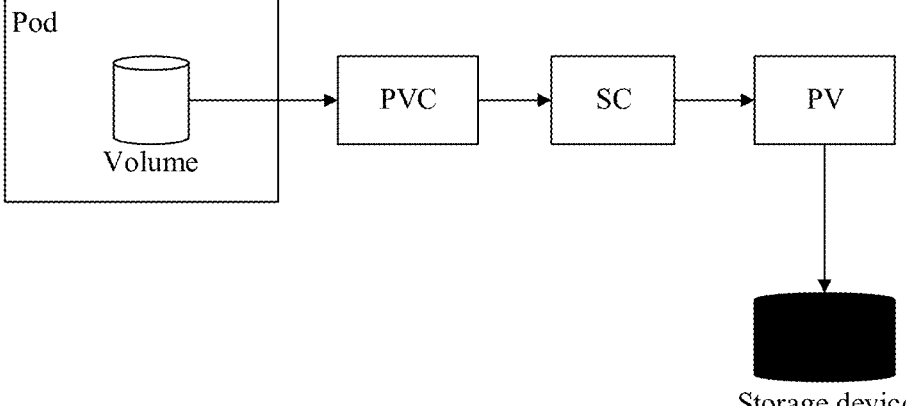
FIG. 3 is a schematic diagram of a relationship between a storage resource, a PV, an SC, and a PVC.

In some scenarios, when creating the PVC, a user can define a storage class (SC). The SC describes storage type "classification" in a cluster. FIG. 3 shows a relationship between a storage resource, a PV, an SC, and a PVC. When the PVC is claimed, the SC is defined to dynamically create a PV corresponding to the SC type. During use, a volume of a pod is associated with the PVC, so that the pod can use the storage resource. For example, the SC can include a disk, NAS, and OBS.

For example, if the user needs to use the NAS-type storage, in the created PVC, the SC is an identifier of the NAS. Correspondingly, a container cluster may create a PV of the NAS type. In this way, the PV does not need to be pre-created in the cluster, and only the PV needs to be dynamically created based on a user requirement when the user requires the storage space, thereby avoiding a waste of the storage space.

The foregoing descriptions of the concepts may be used in the following embodiments.

Deploying the application in the container cluster may generate a plurality of types of data. At a container layer, the data is stored in a mounted volume. However, at a storage layer, a storage space of the volume is specifically provided by the storage device. Therefore, the data is actually stored in a physical storage location of the storage device. Because the container cluster involves a large quantity of objects, has complex structures, and has a large quantity of types of storage devices for storing data, a process of obtaining the storage-related data of the application by the data service or an external apparatus is complex, and efficiency is low. In addition, each data service may need to repeatedly perform the foregoing complex obtaining process, thereby causing a waste of resources.

In view of this, this application provides a container storage management method and a related apparatus. In embodiments of this application, storage association information of an application can be collected, and a plurality of pieces of storage association information are summarized to obtain a storage topology of the application, to centrally manage and maintain storage topologies of applications.

The storage topology may be provided for a data service to use. On one hand, in a development or running process, an upper-layer data service can conveniently and quickly obtain a storage topology of a required application, and does not need to obtain different storage information from a plurality of places or summarize the information, so that a development and running process of each data service is simpler and more efficient, and an error is not likely to occur, thereby improving service efficiency and quality of service of the data service.

On the other hand, in this embodiment of this application, storage topologies of applications can be centrally managed and maintained for using of a plurality of data services together, and each service does not need to perform a process of generating the storage topology, thereby avoiding repeated work of each data service, and further reducing consumption of computing resources in a container cluster.

In addition, in this embodiment of this application, a sensing requirement of the user on the storage topology can be further met through a service interface, thereby improving quality of service of the application.

In this embodiment of the present invention, independent storage topology information is generated and stored, and each data service does not need to generate storage topology information exclusively occupied by the data service. When a data service sends a query request, the storage topology information may be returned. When a plurality of data services send query requests, the storage topology information may be used by the plurality of data services together. The plurality of data services that send the query requests are different types of data services, and the types of the data services include, for example, migration, backup, active-active, or disaster recovery. In a few cases, the plurality of data services may also be data services of a same type, for example, query requests sent by different migration services or query requests sent by different backup services. The query requests can be sent at the same time or at different time points.

The following describes an example of a system architecture in embodiments of this application. It should be noted that the network architecture described in this application is intended to describe the technical solutions in this application more clearly, but are not intended to limit the technical solutions provided in this application. A person of ordinary skill in the art may know that as the network architecture evolves and a new service scenario emerges, the technical solutions provided in this application are also applied to a similar technical problem.

Figure 4:
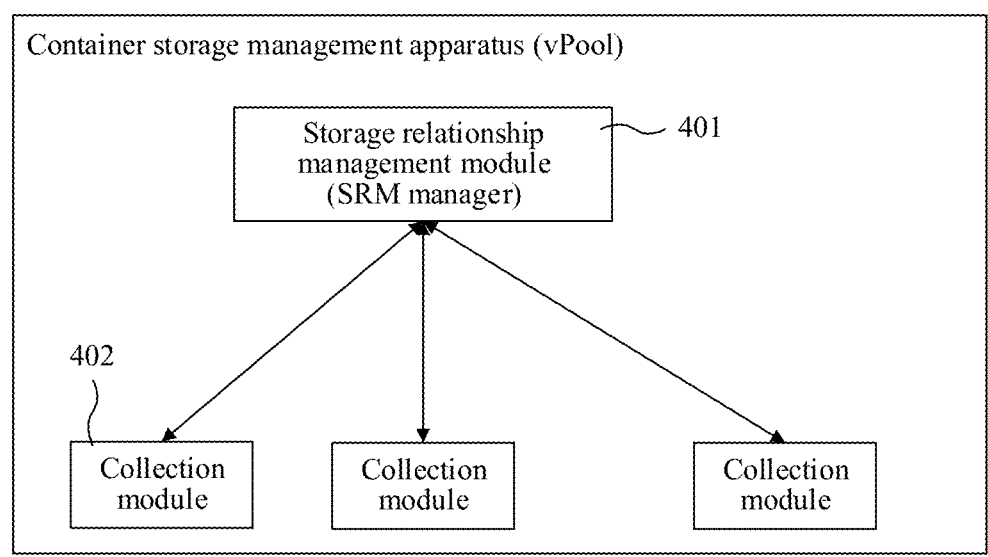
FIG. 4 is a schematic diagram of a structure of a container storage management apparatus according to an embodiment of this application.

FIG. 4 is a schematic diagram of a possible structure of a container storage management apparatus according to an embodiment of this application. In some scenarios, the container storage management apparatus is also referred to as a vPool.

The container storage management apparatus includes a storage relationship management (SRM) module 401 and a collection module 402. The storage relationship management module may also be referred to as an SRM manager. A quantity of storage relationship management modules and a quantity of collection modules shown in FIG. 4 are merely examples. In a specific implementation process, there may be one or more storage relationship management modules and/or collection modules.

The collection module 402 can complete functions such as information collection or information reporting, for example, collecting storage association information. The storage association information herein refers to information related to data storage of an application. Further, the storage association information collected by the collection module may be reported to the storage relationship management module. Correspondingly, the storage relationship management module receives the storage association information reported by the collection module.

The storage relationship management module 401 has a computing capability, and can implement one or more functions of obtaining, summarizing, generating, calculating, processing, determining, and the like. For example, the storage relationship management module can summarize the storage association information to obtain a storage topology of the application. The storage topology of the application includes an association between the application and a physical storage location. The physical storage location is a location at which a storage device stores data of the application (which is described in detail in the following).

It should be noted that, in this embodiment of this application, the storage topology of the application includes an association between an element of the application and the physical storage device.

The element of the application includes but is not limited to one or more of platform-defined application information (or referred to as container cluster-defined application information), application configuration information, a Kubernetes object, a pod, a container, a volume, or the like of the application. For terms such as the Kubernetes object, the pod, the container, or the volume, refer to definitions in the foregoing term explanation part, or refer to definitions in the conventional technology. The configuration information of the application includes but is not limited to a configuration file (for example, a ConfigMap), account information, security information (for example, a secret), a network configuration file, or permission information (for example, a license) of the application. The platform-defined application information is related to a container cluster provider and is optional information. Some providers provide some cluster-level Kubernetes objects or function encapsulations in container clusters for users to use during deployment of applications. These Kubernetes objects or function encapsulations are the platform-defined application information.

There is the association between the element of the application and the physical storage location, for example, a physical storage location corresponding to the configuration information of the application, or a physical storage location corresponding to the volume. In some scenarios, the association between the element of the application and the physical storage location is also referred to as mapping.

Optionally, when the application includes a plurality of elements, the storage topology of the application may further include an association between the plurality of elements of the application. It should be noted that the association includes but is not limited to an inclusion relationship, a binding relationship, a dependency relationship, a mapping relationship (or referred to as a correspondence), and the like. For example, the application includes a Kubernetes object, the Kubernetes object includes a pod, the Kubernetes object includes a container, the Kubernetes object is deployed in a Node, and the pod corresponds to a volume for storing data.

Because the storage topology of the application is obtained based on the storage association information, the storage association information may include one or more of the following: a single element of the application, an association between the element of the application and the physical storage location, a plurality of elements of the application, an association between the plurality of elements of the application, and the like.

Figure 5:
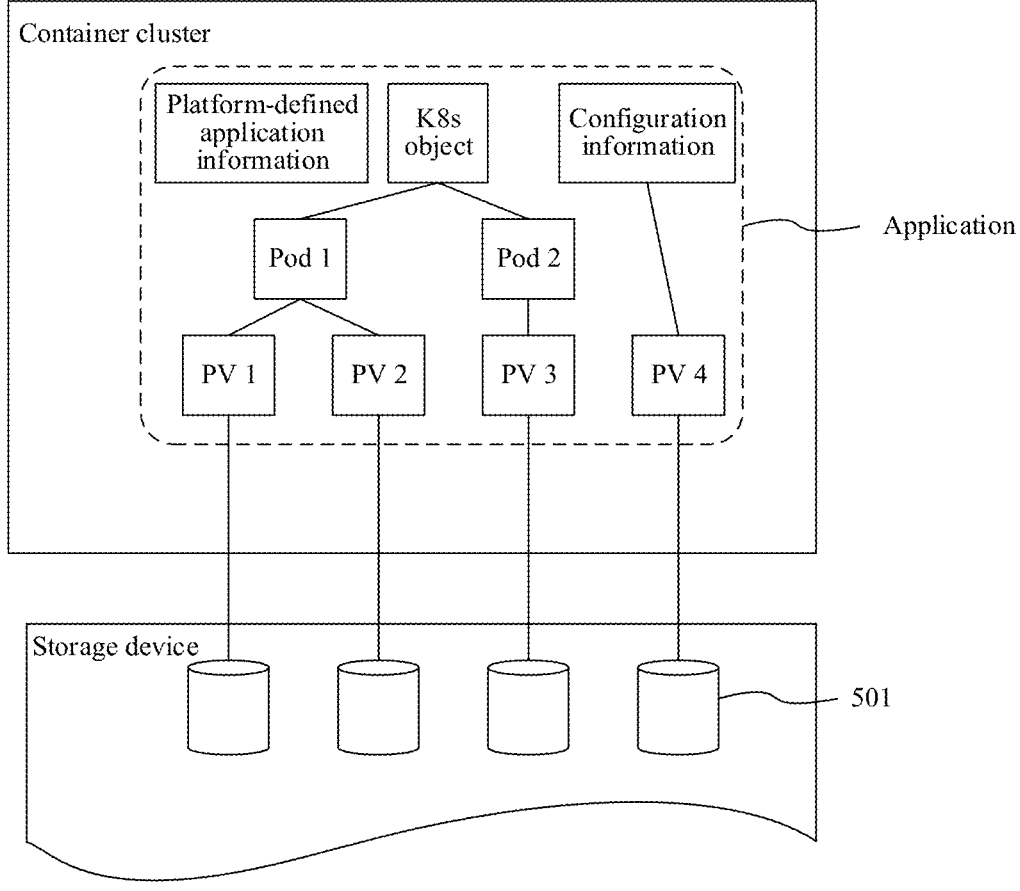
FIG. 5 is a schematic diagram of a storage topology of an application according to an embodiment of this application.

For ease of understanding, the following briefly describes an example of a storage topology. FIG. 5 is a schematic diagram of a possible storage topology of an application according to an embodiment of this application. The storage topology includes an association between an element of the application and a physical storage location. Specifically, the storage topology includes elements such as platform-defined application information, a K8s object, configuration information, a pod, a PVC, and a PV, and further includes the physical storage location. In addition, the storage topology further includes an association relationship between the plurality of elements of the application and an association relationship between the element of the application and the physical storage location.

For example, the storage topology includes an association relationship of "configuration information-PV-physical storage location" ("-" represents an association relationship). In other words, the application includes the configuration information, storage of the configuration information corresponds to a PV 4, and the PV 4 corresponds to a physical storage location 501 in the storage device.

Because the storage topology reflects a location in which data of the application is stored in the storage device, when data needs to be obtained, the data may be obtained based on a physical storage location of the data in the storage topology. For example, an external apparatus needs to obtain data content of the configuration information, and may read the data content by accessing the physical storage location 501. In conclusion, the storage topology makes a process of obtaining the data simple, efficient, and error-free.

It should be noted that the storage topology shown in FIG. 5 is an example storage topology provided for ease of description, and is not intended to limit the storage topology. In a specific implementation process, the storage topology may include more or fewer elements. A quantity of elements is not strictly limited in this embodiment of this application.

For example, in some possible implementation solutions, a storage resource provided by the storage device is exposed to a container cluster through a container storage interface (CSI). In other words, the PV is associated with the storage device through a CSI driver. Therefore, the element of the application further includes the CSI driver, or an interface provided by the CSI driver. For example, the storage topology may correspondingly include an association between the PV, the CSI driver, and the physical storage location.

In a possible solution, in this embodiment of this application, the storage topology is collected in real time, can reflect a current (or recent) storage topology of the application, and can meet an accuracy requirement of a user for the storage topology.

It should be noted that the real-time collection herein has a plurality of possible implementations. For ease of understanding, several possible implementations are listed in this embodiment of this application.

Implementation 1: The collection module performs real-time collection, and the storage relationship management module may refresh the storage topology of the application. A trigger condition and a trigger occasion of the refreshing are not strictly limited in this application. For example, the storage topology may be periodic refreshed or aperiodic refreshed.

For example, in the periodic refreshing manner, the collection module may report the storage association information to the storage relationship management module at a specific interval (which is referred to as first duration for ease of description), and the storage relationship management module may summarize the storage association information reported by the collection module at a specific interval (which is referred to as second duration for ease of description), to obtain the current storage topology. It should be noted that the first duration and the second duration may be different, or may be the same. This is not limited in this application.

In this refreshing manner, the collection module needs to periodically report information (for example, report the information every one minute). Therefore, the storage relationship management module can monitor a running status of the collection module. For example, if the collection module still does not report the storage association information within specific duration, it indicates that a fault may occur on a node at which the collection module is deployed, or a function fault of the collection module may occur. In this case, a corresponding emergency solution may be triggered. For example, the storage relationship management module may send a notification for the fault state. In other words, the periodic reporting manner may monitor a running status of the collection module and/or a running status of the node at which the collection module is located, thereby improving system stability.

For example, in the non-periodic refreshing manner, the container storage management apparatus refreshes the storage topology of the application when the storage topology changes. Specifically, when the storage association information changes, the collection module may report changed storage association information to the storage relationship management module. The storage relationship management module updates, based on the changed storage association information, a changed part of the storage topology, to obtain the current storage topology.

In this case, on one hand, computing overheads and network overheads of communication can be reduced, and on the other hand, updating of the storage association information can be reflected in the storage topology in a timely manner, and accuracy of the storage topology is higher. In addition, the storage relationship management module updates only the changed part of the storage association relationship, but does not completely regenerate the storage topology, thereby greatly reducing running pressure of the storage relationship management module and further improving efficiency of updating the storage topology.

Implementation 2: The collection module performs collection when the storage topology is required, and the storage relationship management module obtains the current storage topology based on collected storage correlation information.

For example, the storage relationship management module receives a request for querying the storage topology of the application. In response to the query request, the collection module collects storage association information and reports the storage association information to the storage relationship management module. The storage relationship management module obtains the storage topology of the application based on the current storage association information. In this case, a running status of the collection module may be monitored, and the current real-time storage topology may also be obtained when the storage topology is required, so that accuracy is high.

It should be noted that the foregoing is an example description for ease of understanding the concept of "real-time collection". This is not intended to limit this embodiment of this application. In a specific implementation, the real-time collection of the storage topology may be implemented in another implementation. The foregoing real-time manners may be further combined, and combination cases are not described one by one in this application.

The foregoing describes the architecture and the storage topology of the container storage management apparatus, and the following describes an implementation of the container storage management apparatus.

In a possible implementation solution, the container cluster includes a plurality of nodes, and the collection module 402 may be deployed on one or more nodes in the container cluster. For ease of description, an apparatus in which the collection module is deployed is referred to as a collection point in the following some embodiments.

For example, when the container cluster includes a Master, a Node, and the like, the collection module 402 may be deployed on one or more apparatuses of the Node, the Master, an operation and maintenance node, a storage device, or the like. For details about the Node and Master, refer to the term descriptions. The operation and maintenance node is a node that is set in some container clusters and has a management attribute, and is used to implement operation and maintenance of the container cluster.

Figure 6:
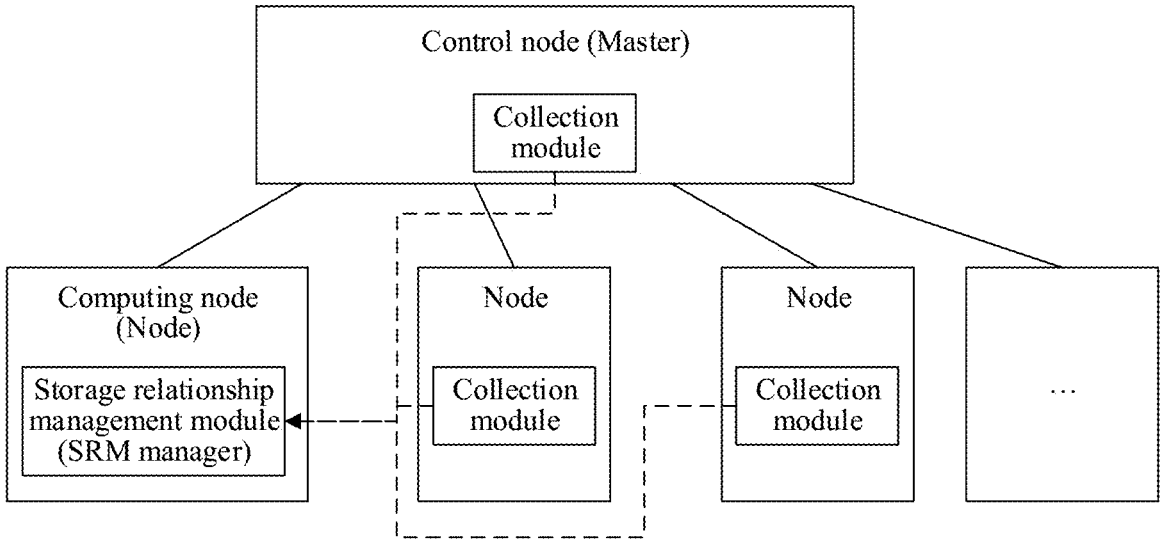
FIG. 6 is a schematic diagram of deployment of a container storage management apparatus according to an embodiment of this application.

For example, refer to FIG. 6. FIG. 6 is a schematic diagram of possible deployment of a container storage management apparatus according to an embodiment of this application. The collection module 402 may be deployed on a Node and/or a Master, and collects storage association information from the Node and/or the Master. The storage relationship management module 401 may be deployed on the node Node.

For another example, the collection module may be deployed in a database on a node. Optionally, the database may include an operation and maintenance database, a storage database, an ECTD database, and the like. Further, optionally, the database may be directly deployed on the node, or the node has an agent module of the database.

For example, the node Master includes the ECTD database. In this case, the collection module can be deployed on the Master to collect the storage association information from the ECTD database.

In conclusion, the container storage management apparatus included in this embodiment of this application includes the storage relationship management module and the plurality of collection modules. The plurality of collection modules separately collect storage association information at the plurality of collection points. Correspondingly, the storage relationship management module may summarize the plurality of pieces of storage association information, and generate the storage topology of the application based on the storage association information.

Because the collection module is deployed at the collection point, when the storage relationship management module generates the storage topology, the storage relationship management module only needs to summarize the storage association information reported by the collection module, and does not need to actively read data from the collection points. Therefore, in this embodiment of this application, the storage topology of the application can be quickly and accurately generated.

In some scenarios, the storage association information may be information that is preprocessed (for example, data cleaning, deduplication, or conversion into a predefined format). Optionally, when collecting information, the collection module preprocesses the collected information to obtain the storage association information. In this way, computing pressure of the storage relationship management module can be reduced, and a rate at which the storage relationship management module generates the storage topology can be further improved.

It should be noted that terms such as "module" and "apparatus" used in embodiments of this application may be used to represent a computer-related entity, a virtualization device, hardware, firmware, software, a process, a thread, software being executed, a combination of hardware and software, and the like. For example, the collection module may include but is not limited to physical hardware (for example, one or more of a processor entity, a circuit entity, or a chip entity), a virtualization device (for example, a virtual machine or a container), software (for example, one or more of an image software package, an executable file, computer instructions, or computer programs that can run on a processor), or a combination of hardware and software (for example, a storage medium storing computer programs or a processor that executes computer instructions). For example, a function of the collection module 402 is implemented based on the process. The storage relationship management module includes a plurality of containers, and the plurality of containers jointly implement the function implemented by the storage relationship management module 401.

In still another possible implementation solution, the storage relationship management module (SRM manager) is deployed in a Node in a form of StatefulSet. The StatefulSet is a Kubernetes object, and is usually also used as a controller for managing an application. Pods managed by the StatefulSet are distinguished by IDs or sequence numbers. During communication, the pods managed by the StatefulSet also have network identifiers used to identify the pods. The collection module is deployed in a form of DaemonSet. In this case, the collection module may also be referred to as an SRM-daemon. In other words, the DaemonSet in the Node can implement the function of the collection module. The DaemonSet is a Kubernetes object and can be considered as a daemon process. Through DaemonSet, a group of pods with the same or similar functions run on a node in the cluster. The pod is used to implement the daemon process on the node.

Figure 7:
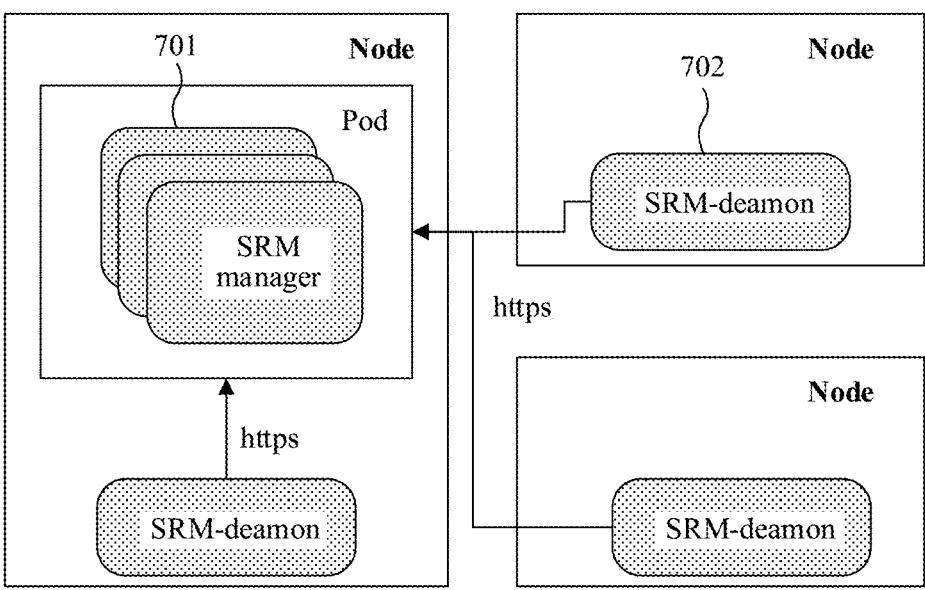
FIG. 7 is a schematic diagram of still another deployment of a container storage management apparatus according to an embodiment of this application.

FIG. 7 is a schematic diagram of still another deployment of a container storage management apparatus according to an embodiment of this application. An SRM manager 701 is, for example, deployed on a Node, and may be specifically deployed in one or more pods on the Node. A collection module is an SRM-daemon 702, for example, deployed on a Node. The SRM-daemon can collect storage association information and synchronize the storage association information to the SRM manager 701. Correspondingly, the SRM manager 701 summarizes a plurality of pieces of storage association information to obtain a storage topology of an application.

For example, the SRM-daemon and the SRM manager may communicate with each other through a hypertext transfer protocol over secure socket layer (HTTPS) protocol.

It should be noted that, for ease of description, FIG. 7 uses the SRM manager and the SRM daemon deployed on the Nodes as an example, and does not limit deployment locations/a deployment location of the SRM manager and/or the SRM daemon. In a specific implementation process, the SRM manager and/or the SRM daemon may be deployed in a Node and/or a Master in a container cluster, for example, may be further deployed at a location, for example, an operation and maintenance node or a storage device.

The storage topology in this embodiment of this application may be provided to the outside. The outside herein includes but is not limited to one or more of a data service, a third-party device, or another cluster. A manner of providing for the outside may be actively providing, or may be providing for the outside in response to an external request.

For example, the storage topology is provided for the data service. The container storage management apparatus may respond to a request of one or more data services, and provide the storage topology of the application for the one or more data services.

In a possible solution, the container storage management apparatus may provide a service interface, and provide the storage topology for the one or more data services through the service interface.

Figure 8:
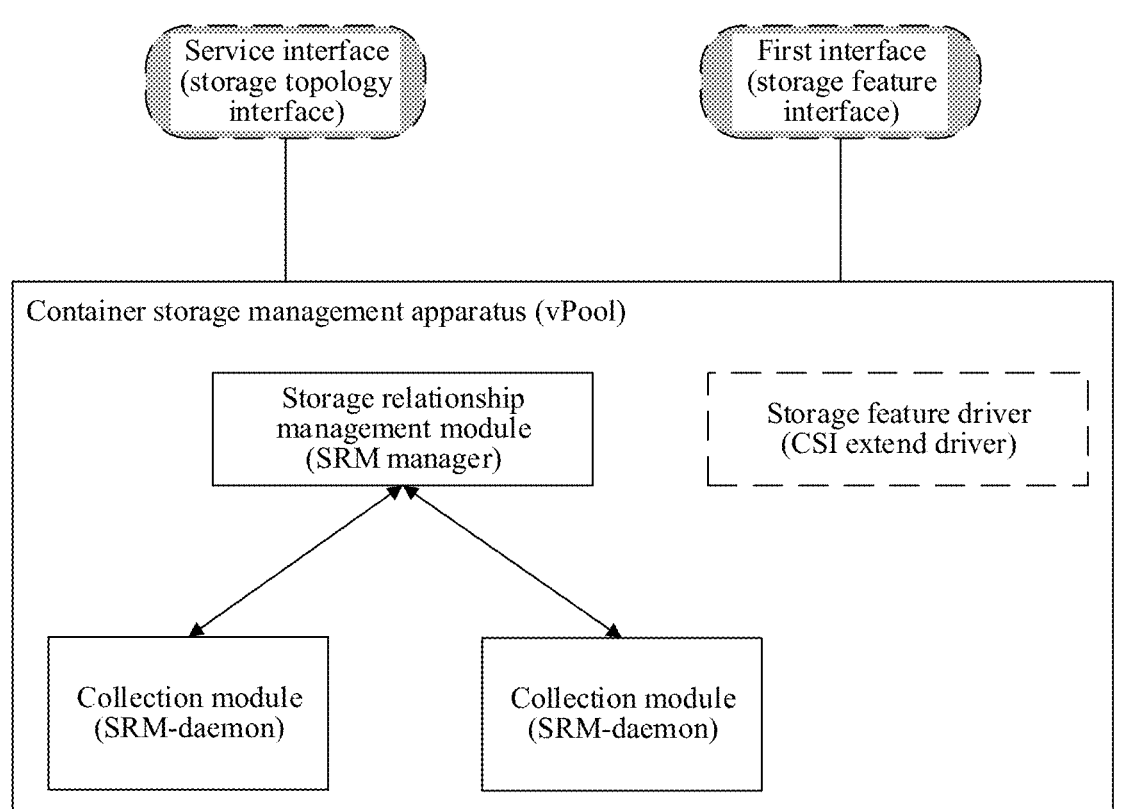
FIG. 8 is a schematic diagram of a structure of a container storage management apparatus according to an embodiment of this application.

FIG. 8 is a schematic diagram of still another possible structure of a container storage management apparatus (also referred to as a vPool) according to an embodiment of this application. For descriptions related to the storage relationship management module and the collection module, refer to the descriptions of the corresponding modules in FIG. 4. The container storage management apparatus may further provide a service interface (also referred to as a storage topology interface in some scenarios). A device, a service, or the like other than the container storage management apparatus may obtain a storage topology of an application through the service interface. For example, a data service invokes the service interface to query the storage topology of the application.

It should be understood that running of the container storage management apparatus may further be closely related to a storage device. The storage device is usually provided by a storage vendor. Therefore, storage devices used by applications to store data may come from different storage vendors. With development of storage technologies, in addition to providing the data storage function, the storage device may further support a plurality of storage functions (or referred to as storage features) in addition to storage. These storage functions are especially applicable to the foregoing application-oriented data service scenarios, for example, data services such as migration, backup, active-active, or disaster recovery of the application. For example, the storage function may include, for example, high-speed link storage, compression, deduplication, replication, and backup.

The different storage vendors may provide different storage functions. Even if a same storage vendor provides different storage products, storage functions may also be different. Different storage functions are usually invoked through different interfaces. Such interface is usually a private interface provided by the storage vendor. Therefore, in some conventional technologies, when the data service needs to use the storage function, compatibility adjustment needs to be performed on code of the data service. This not only causes redundancy of the code of the data service and high development costs, but also reduces running efficiency of the data service.

Therefore, optionally, to enable the data service or the application to better use the storage functions provided by the different storage vendors (or different storage products), the container storage management apparatus may further provide a first interface. The first interface may be configured to implement unified invoking of the storage functions of the different storage vendors (or the different storage products). For example, the data service or the application may invoke the function of the storage device by invoking the first interface.

In some possible designs, the container storage management apparatus includes a storage feature driver module. The module may communicate with the different storage devices, abstract a unified storage feature interface (or referred to as a first interface) based on underlying storage features provided by the different storage devices, and provide the foregoing first interface for the outside based on this.

Optionally, the storage feature driver module may be a CSI driver and/or a CSI extension driver. Correspondingly, the first interface provided by the container storage management apparatus (or the storage feature driver module in the container storage management apparatus) for the outside may be a CSI interface, or may be a container storage interface extension (CSI Extend). The CSI is an industry standard interface specification, and aims to expose a storage system to the application. The CSI Extend is an extension of the CSI.

It should be noted that the first interface is an example name provided to distinguish the foregoing service interface. In a specific implementation process, names of interfaces such as the first interface and the service interface may be replaced. In addition, a quantity of interfaces included in the first interface is not strictly limited in this application, and the first interface may include one or more interfaces. For example, the first interface may include a plurality of interfaces such as an interface used to invoke a high-speed storage link, and an interface used to invoke a compression function.

Optionally, the first interface is provided in an application programming interface (API) manner.

In conclusion, the first interface may be used as a standard interface of the data service, the application, or the like to invoke the storage functions of the different vendors. Through the first interface, decoupling between the data service, the application, and underlying storage can be implemented, a problem that interfaces need to be re-adapted for interconnection with the different storage vendors (or the different storage products) is resolved, and efficiency and reliability of development and running of the data service or the application are improved.

The following describes a running process of the container storage management apparatus by using an example in which a plurality of data services query the storage topology through the service interface. The data service is a series of application-oriented extended services, such as application backup, disaster recovery, migration, and security, provided by managing, collecting, analyzing, and processing user applications. In some implementations, the data service may be a type of preset services provided by the container cluster for the user.

Figure 9:
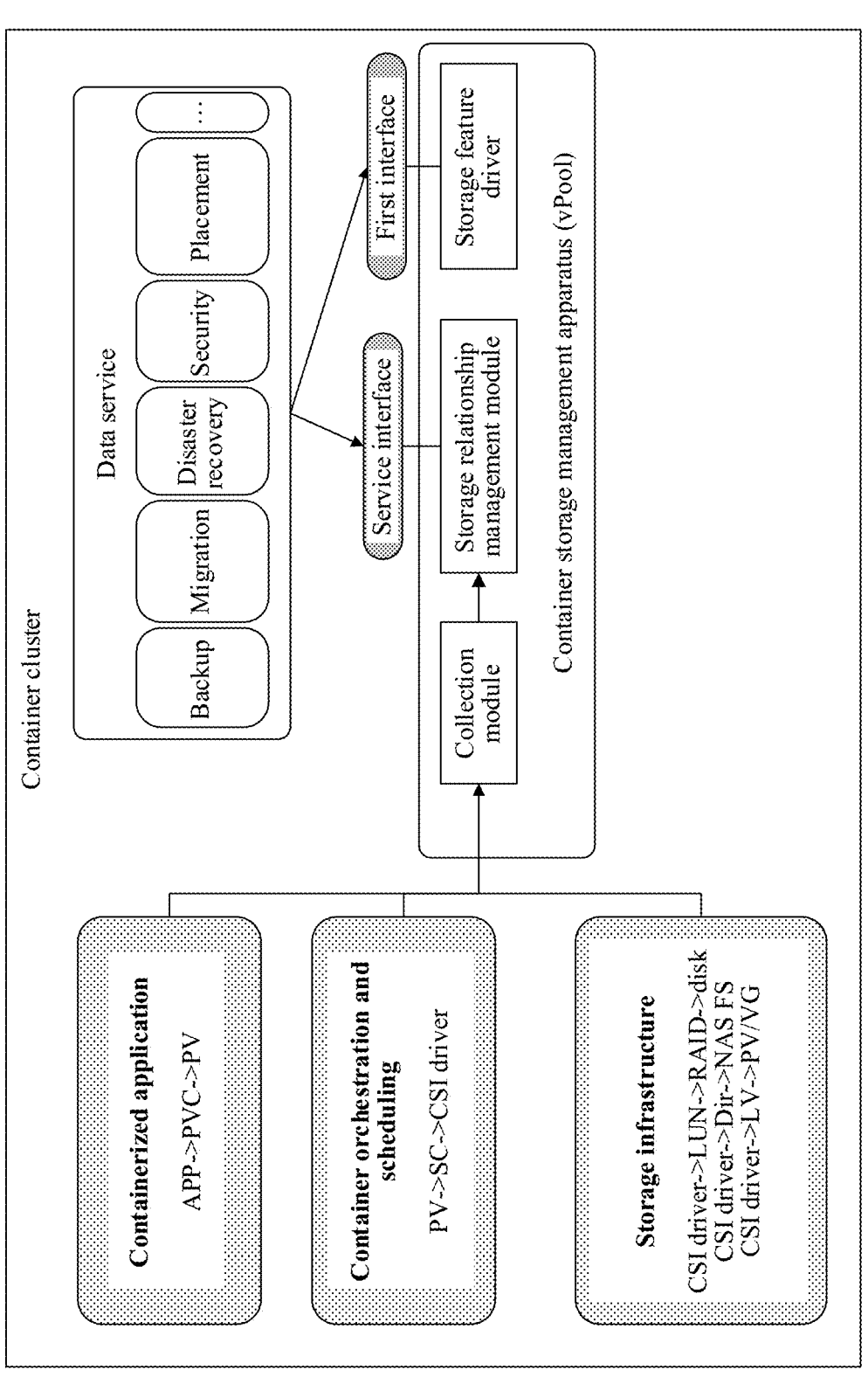
FIG. 9 is a schematic diagram of a running scenario of a container storage management apparatus according to an embodiment of this application.

FIG. 9 is a schematic diagram of a running scenario of a container storage management apparatus according to an embodiment of this application. For functions of modules of the container storage management apparatus, refer to the related descriptions in FIG. 8.

The container storage management apparatus may enable a data service to conveniently and quickly obtain a storage topology of a required application through a service interface.

Optionally, the container storage management apparatus may further enable, through a first interface, the data service to invoke a storage function provided by the storage device.

It should be noted that, in the scenario shown in FIG. 9, storage association information collected by the collection module includes information at three levels, and the three levels are a containerized application layer, a container orchestration and scheduling layer, and a storage infrastructure layer.

Each level includes a plurality of elements and/or a physical storage location of the application, there is a correspondence between the plurality of elements of the application, and there is an association between an element of the application and the physical storage location. Details are as follows:

At the first layer, storage-related information of the containerized application layer may include: a Kubernetes object included in the application, configuration information of the application, an association between the Kubernetes object and a PVC, an association between the configuration information and the PVC, an association between the PVC and a PV, and the like. In FIG. 9, "application (APP)->PVC->PV" is used as an example to represent an association relationship among the three.

The second layer, that is, the container orchestration and scheduling layer includes an association relationship between a PV, an SC, and a CSI driver. It should be noted that, in the storage topology shown in FIG. 9, the CSI driver is represented by using an example of a block, but this does not represent a limitation on a quantity of CSI drivers in this application. In a specific implementation process, there may be one or more CSI drivers.

The third layer, that is, the storage infrastructure layer includes an association relationship between a volume and the physical storage location. Because the storage device is exposed to the container cluster through the CSI driver, the storage infrastructure layer includes an association relationship between the volume, the CSI driver, and the physical storage location.

The storage association relationship is represented in different forms due to different types of storage devices.

For example, for block storage, the storage association information includes an association relationship between the CSI driver and one or more of the following: a logical unit number (LUN), a disk array (RAID), or a disk.

For another example, for file storage, the storage association information includes an association relationship between the CSI driver and one or more of the following: a file directory, a NAS file system (FS), or the like.

For another example, for a hard disk, the storage association information includes an association relationship between the CSI driver and one or more of the following: a logical volume (LV), a physical volume (PV), a (physical) volume group (VG), and the like.

Figure 10:
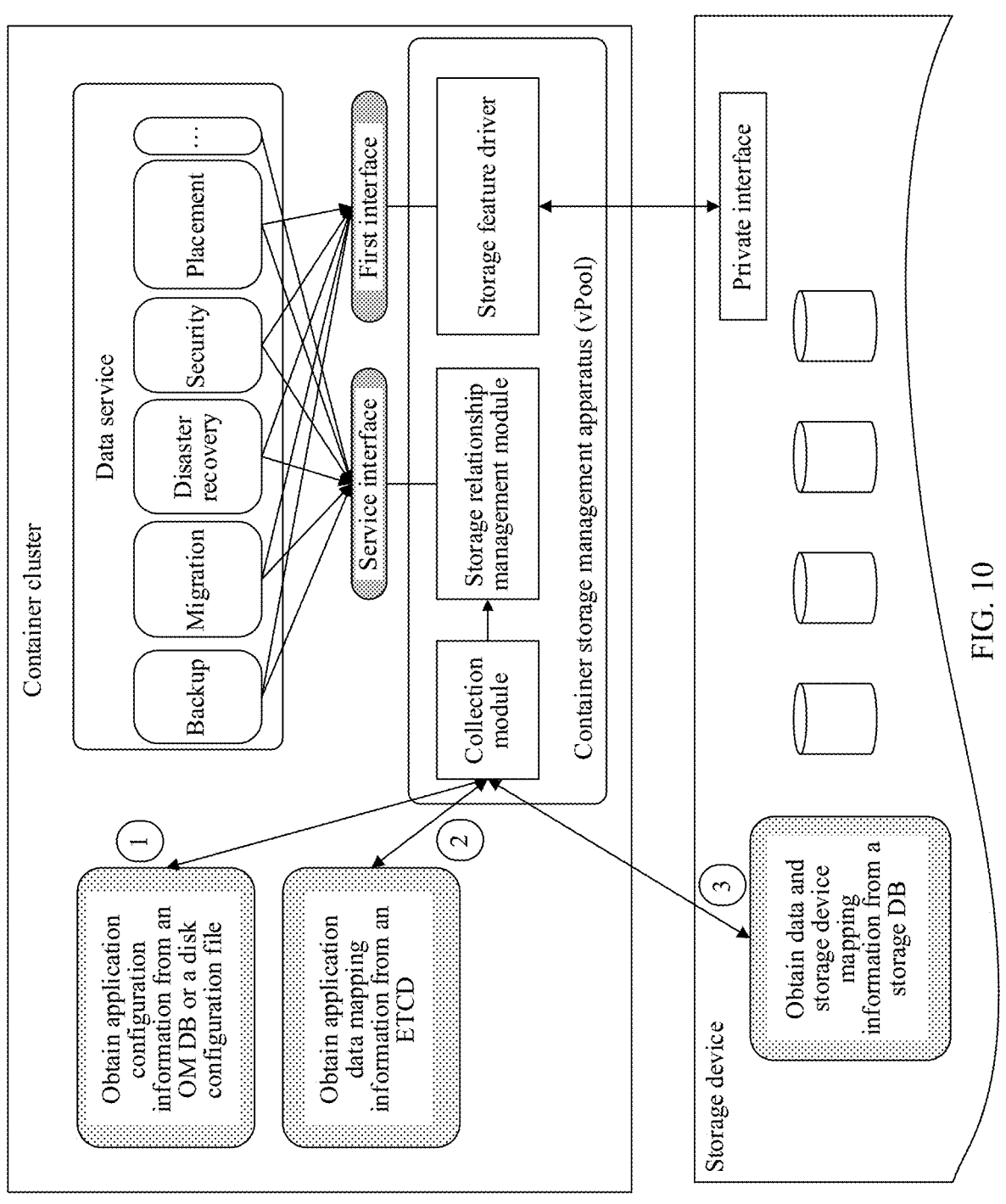
FIG. 10 is a schematic diagram of still another running scenario of a container storage management apparatus according to an embodiment of this application.

FIG. 10 is a schematic diagram of still another possible running scenario of a container storage management apparatus according to an embodiment of this application. For functions of modules of the container storage management apparatus, refer to the related descriptions in FIG. 8.

It should be noted that in the embodiment shown in FIG. 10, storage association information includes application configuration information (that is, a collection point ①) shown in FIG. 10), application data mapping information (that is, a collection point ②) shown in FIG. 10), mapping information between data and a storage device (that is, a collection point ③) shown in FIG. 10), or the like.

The application configuration information is information related to configuration of an application.

For example, the application configuration information includes but is not limited to a ConfigMap, a secret, a network configuration file, permission information, or the like. Optionally, the application configuration information may be stored in an operation and maintenance database (OM DB).

The application data mapping information indicates logical storage mapping of data of the application, and includes but is not limited to a Kubernetes object included in the application, a pod corresponding to the Kubernetes object, a volume corresponding to the pod, or the like. The application data mapping information may be stored in an ECTD, and/or the application data mapping information may be stored on a node, for example, a Node (not shown in FIG. 10).

A storage mapping relationship between the data and the storage device, that is, a physical storage location of the data in the storage device. Optionally, the storage mapping relationship between the data and the storage device is stored in a storage database (DB) or a disk configuration file.

It should be understood that the data service and the collection location shown in FIG. 10 are merely examples, and are not intended to limit a running scenario of the container storage management apparatus.

It should be noted that the collection point ③) shown in FIG. 10 may not be actually located in the storage device, and the collection location shown in FIG. 10 is merely an example.

For example, in some scenarios, a container cluster has an agent module of the storage device, and a collection module is deployed on a node (for example, a Node or a Master) on which the agent module is located, so that a collection requirement for the storage mapping relationship can be met.

To facilitate understanding of the storage topology used by the data service, the following uses an application migration scenario as an example to briefly describe how the data service uses the storage topology.

The application migration is a data service of migrating an application in a container cluster to another container cluster. For ease of understanding, the following uses an example in which the cluster from which the application is migrated is a first container cluster and the cluster to which the application is migrated is a second container cluster for description. Generally, the first container cluster and the second container cluster are different container clusters. Certainly, vendors of the first container cluster and the second container cluster may be the same. For example, the first container cluster and the second container cluster are different container cluster products provided by a same vendor.

In other words, the application migration process is performed in a system (referred to as a service providing system below) including the first container cluster and the second container cluster. An application is deployed in the first container cluster, and the data service can migrate the application from the first container cluster to the second container cluster.

In some scenarios, the data service is an extended service provided by the container cluster. Therefore, in this embodiment of this application, the data service may be provided by the first container cluster and/or the second container cluster. Certainly, the data service may also be located on a device (that is, provided by a third-party device) other than the first container cluster and the second container cluster.

For ease of understanding, the following uses the application migration as an example to describe three examples of entities that provide the data service.

Example 1: The data service is provided by the first container cluster. For example, the first container cluster provides an application migration-out service for the application deployed on the first container cluster. In other words, the application migration-out service can migrate the application in the first container cluster to another container cluster (for example, the second container cluster).

Example 2: The data service is provided by the second container cluster. For example, the second container cluster provides an application migration-in service, and a user may migrate an application in another container cluster (for example, the first container cluster) to the second container cluster by using the application migration-in service.

Example 3: The data service is provided by the third-party device. For example, a third-party data service vendor provides an application migration service, and the application migration service can communicate with the first container cluster and the second container cluster, to migrate the application in the first container cluster to the second container cluster.

It should be noted that the foregoing three entities (for example, any container cluster, several nodes in the container cluster, or the third-party device) that provide the data service are merely examples, and are not used to limit the data service.

The data service is implemented by an apparatus. Generally, the data service is provided by a subject, and the apparatus for implementing the data service is located on the subject. However, in some scenarios, the data service involves multi-party interaction. Although the data service is provided by a specific entity, an apparatus for implementing the data service may be located on a plurality of entities.

In a possible solution, the data service includes one or more sub-services, and the one or more sub-services are used to jointly implement functions of the data service on different subjects.

Figure 11:
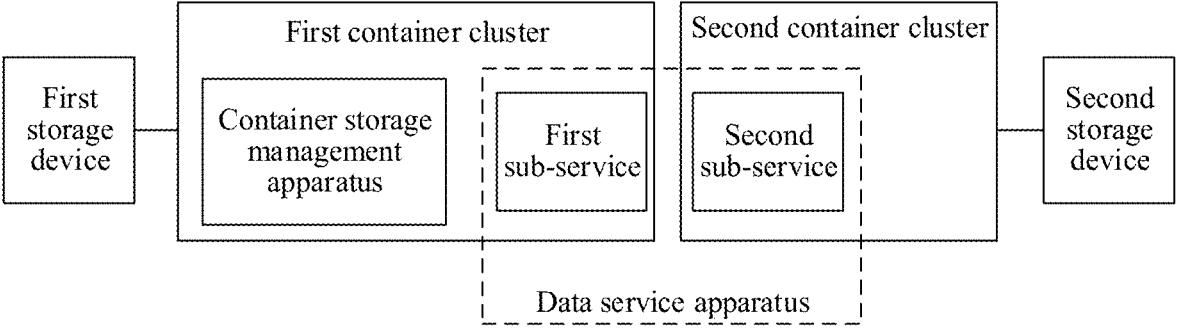
FIG. 11 is a schematic diagram of an architecture of a service providing system according to an embodiment of this application.

FIG. 11 is a schematic diagram of a possible architecture of a service providing system according to an embodiment of this application. A data service includes a first sub-service and/or a second sub-service. The first sub-service is located in a second container cluster, and is used to perform steps performed by the data service in the second container cluster. The second sub-service is located in a first container cluster, and is used to perform steps performed by the data service in the first container cluster.

The foregoing describes the system architecture used in the application migration, and the following describes an application migration process as an example.

Figure 12:
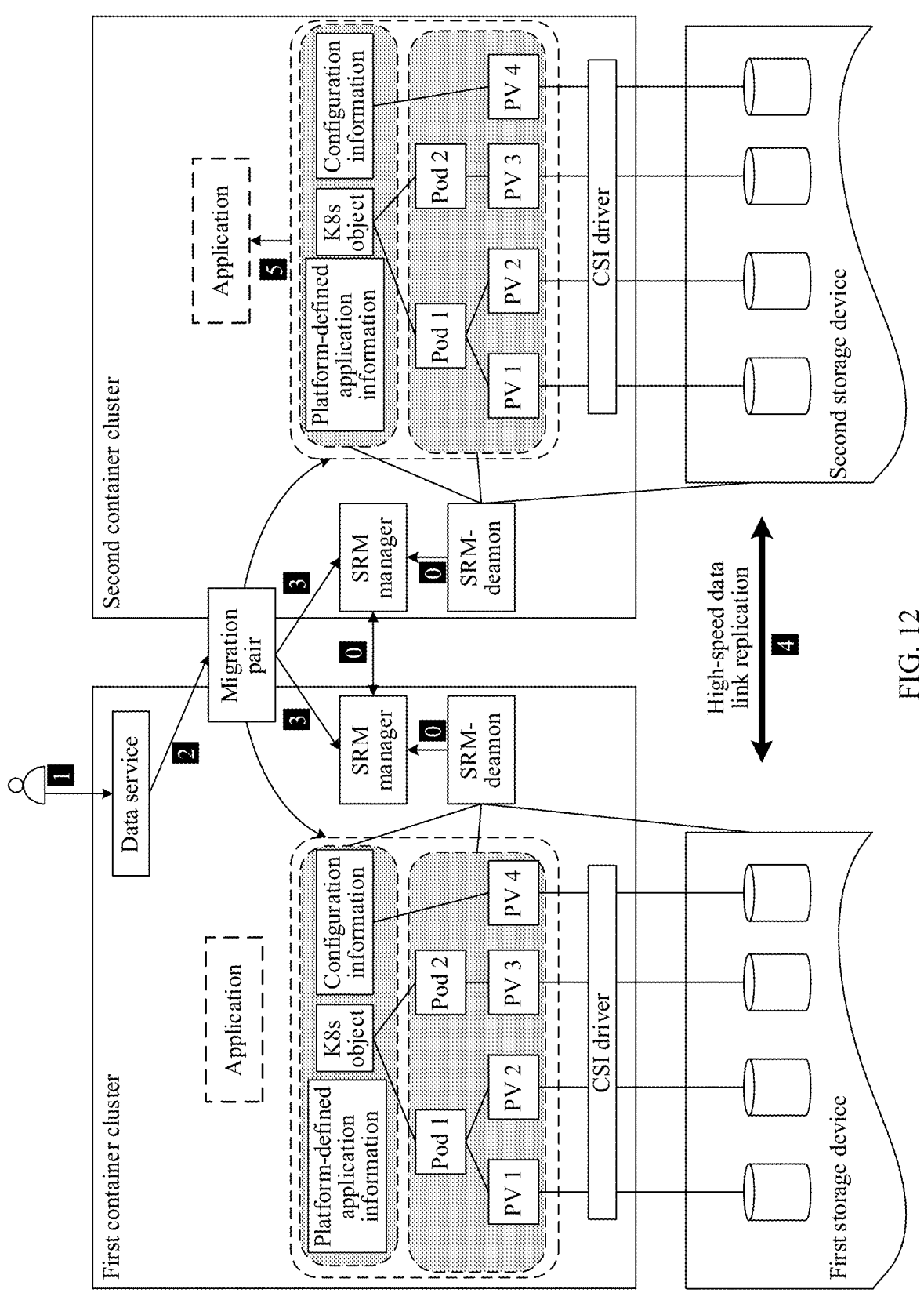
FIG. 12 is a schematic diagram of a running scenario of an application migration service according to an embodiment of this application.

FIG. 12 is a schematic diagram of a running scenario of an application migration service according to an embodiment of this application. As shown in FIG. 12, an application migration process may specifically include the following steps.

Step 0: A collection module (that is, SRM-daemon) in a first container cluster collects a plurality of pieces of storage association information. A storage relationship management module (SRM manager) in the first container cluster collects a plurality of pieces of storage association information collected by a plurality of collection modules, to obtain a storage topology of an application.

In a possible solution, when managing the storage topology of the application, the SRM manager may maintain an identifier of the application corresponding to the storage topology of the application. The identifier of the application includes but is not limited to an ID, a number, a name, and the like. A manner of obtaining an identifier of a to-be-migrated application is not strictly limited in this application. For example, the identifier may be entered by a user or user equipment, or may be delivered by another management device. In this way, it is convenient to distinguish between different applications in a multi-application cluster, and it is also convenient to provide a storage topology of a corresponding application for a data service.

It should be noted that there is a correspondence between the storage topology of the application and the identifier of the application. When the data service queries the storage topology of the application, the identifier of the application may be carried. Correspondingly, the SRM manager provides the storage topology of the corresponding application for the data service based on the identifier of the application.

Step 1: The data service obtains an instruction for migrating the application.

It should be understood that the data service herein may be implemented by using hardware, or may be implemented by using software, or may be implemented by using a combination of hardware and software. Optionally, the data service may be started by the user and/or user equipment.

The data service may provide an interface or a screen, and the user and/or the user equipment may trigger the application migration by invoking the interface or by using the operation screen, so that the data service obtains the instruction for migrating the application.

It should be noted that, in this application, the application migration may be migration of a specified application in the container cluster, or may be migration of all applications in the cluster.

When the specified application in the container cluster is to be migrated, the data service further needs to obtain the identifier of the to-be-migrated application.

Step 2: The data service creates a migration task and generates a migration pair.

The migration pair is a module used for data exchange between a source end (that is, the first container cluster) and a target end (that is, the second container cluster). Optionally, the migration pair includes a plurality of modules, a part of modules are located in the first container cluster, and another part of modules are located in the second container cluster.

The migration pair enables the source end to learn of basic information about the target end and enables the source end and the target end to establish a trust relationship. Optionally, the migration pair can be further used by the target end to prepare for migration.

Step 3: The data service invokes a service interface provided by the SRM manager to query the storage topology of the application.

Optionally, the storage topology of the application may be used by the data service to verify the second container cluster. For example, the data service may calculate container orchestration and an available storage resource in the second container cluster based on obtained storage topology information.

For example, the data service may verify, based on the obtained storage topology information, a storage space, a computing capability, and the like of the second container cluster, to determine whether the second container cluster has an environment condition for deploying the containerized application.

In a possible solution, if the data service determines, based on the storage topology of the containerized application, that the second container cluster meets the condition for deploying the application, subsequent steps may be performed.

In a possible solution, if the data service determines, based on the storage topology of the containerized application, that the computing capability in the second container cluster cannot meet a service load requirement of the application, the data service may feed back the verification result. For example, the data service feeds back that the application cannot be migrated to the second container cluster. For another example, the data service reminds the user to scale out the second container cluster.

Certainly, the storage topology of the application may be further used in another aspect. In this application, use of the storage topology of the application by the data service is not strictly limited. For example, the data service may further migrate, based on the storage topology of the application, the data of the application from a storage device connected to the first container cluster to a storage device connected to the second container cluster (refer to step 4). For another example, the data service determines, based on the obtained storage topology, storage information that can be used for migration in the second container cluster. The data service pre-determines, based on the storage topology, the storage information that can be used for migration, thereby improving efficiency and reliability of migrating the application, avoiding an element establishment error or a data storage error in the migration process, and improving user experience.

Step 4: The data service invokes a first interface provided by the container storage management apparatus in the first container cluster, so that the first storage device migrates the data related to the application to the second storage device.

In some scenarios, when the application is migrated from the first container cluster to the second container cluster, the data of the application also needs to be migrated from the first storage device connected to the first container cluster to the second storage device connected to the second container cluster.

In a possible example, to improve transmission efficiency of the data, the storage device provides a high-speed storage link to transmit the data. The high-speed link herein is a storage function (or referred to as a storage feature), to support data migration, replication, and the like.

For example, the high-speed storage link provided by the first storage device shown in FIG. 12 may be used to support high-speed transmission of the data on the first storage device to another storage device (for example, the second storage device).

Specifically, the high-speed storage link may be a link that is provided by a storage vendor and that is for direct data transmission between storage devices, and the data does not need to be forwarded or controlled by using a computing node. Using the high-speed storage link for data transmission can significantly reduce a data transmission latency and improve data transmission efficiency, so that the application migration process can be completed as soon as possible, and quality of the data service is improved.

Optionally, in this case, the data service may invoke, by invoking the first interface provided by the container storage management apparatus, the high-speed storage link provided by the first storage device, to transmit the data of the application to the second storage device. Correspondingly, the container storage management apparatus may respond to invoking of the first interface by the data service to drive the first storage device to transmit the data of the application to the second storage device through the high-speed storage link.

In a possible solution, the data service may determine, based on the storage topology of the application, a location of the data of the application in the first storage device and a location of the data of the application to be migrated to the second storage device, and then invoke the first interface to migrate the data of the application from the first storage device to the second storage device.

Step 5: The data service reconstructs the application in the second container cluster based on the storage topology of the application and the data of the application.

For example, the data service may reconstruct an association relationship between elements of the application and/or an association relationship between an element of the application and a physical storage location based on the storage topology of the application and the data of the application. The SRM in the second container cluster may maintain the storage topology of the application in the second container cluster.

As shown in FIG. 12, after the application is reconstructed in the second container cluster, a storage topology of the reconstructed application is similar to or even consistent with the storage topology of the original application in the first container cluster, thereby meeting a requirement of the user for the application migration.

Further, the data service may further stop the application in the first container cluster.

Optionally, the storage topology of the application may be obtained by the data service by invoking the service interface of the container storage management apparatus in the first container cluster, or may be obtained by the data service from the second container cluster after the SRM manager in the first container cluster synchronizes the storage topology to the second container cluster.

For example, when the second container cluster also includes a container storage management apparatus, the SRM manager in the first container cluster may synchronize the storage topology of the application to an SRM manager in the second container cluster.

In a possible implementation, the data service may indicate the SRM manager in the first container cluster to synchronize the storage topology of the application to the SRM manager in the second container cluster. In this way, the data service may obtain the storage topology of the application by invoking a service interface provided by the container storage management apparatus in the second container cluster.

It should be understood that the SRM manager in the first container cluster and the SRM manager in the second container cluster may be the same or different during implementation.

In a possible solution, the SRM manager in the first container cluster includes a database component and a synchronizer component, and further provides the service interface. The database component is configured to store the storage topology of the application, and the synchronizer component is configured to send the storage topology of the application. The SRM manager in the second container cluster includes a database component and a synchronizer component. The database component is configured to store the storage topology of the application, and the synchronizer component is configured to receive the storage topology of the application.

In the scenario shown in FIG. 12, the storage relationship management module in the container storage management apparatus centrally manages storage topologies of applications, and an upper-layer data service may obtain the complete storage topology of the application only by invoking the service interface, so that invoking, development, and maintenance of the upper-layer data service are simpler, an error probability is reduced, and reliability is improved.

In addition, the storage topology collected by the storage relationship management module in the container storage management apparatus is collected in real time. Therefore, the data service can quickly obtain the storage topology of the application by using the SRM, so that obtaining efficiency is higher, and accuracy of the obtained storage topology is higher.

In FIG. 12, a running scenario of the container storage management apparatus is described by using an example in which the data service queries the storage topology. However, this application is also applicable to a running scenario in which the container storage management apparatus actively synchronizes the storage topology to the second cluster. The following uses an application backup scenario as an example to describe a scenario in which the container storage management apparatus actively synchronizes the storage topology.

Figure 13:
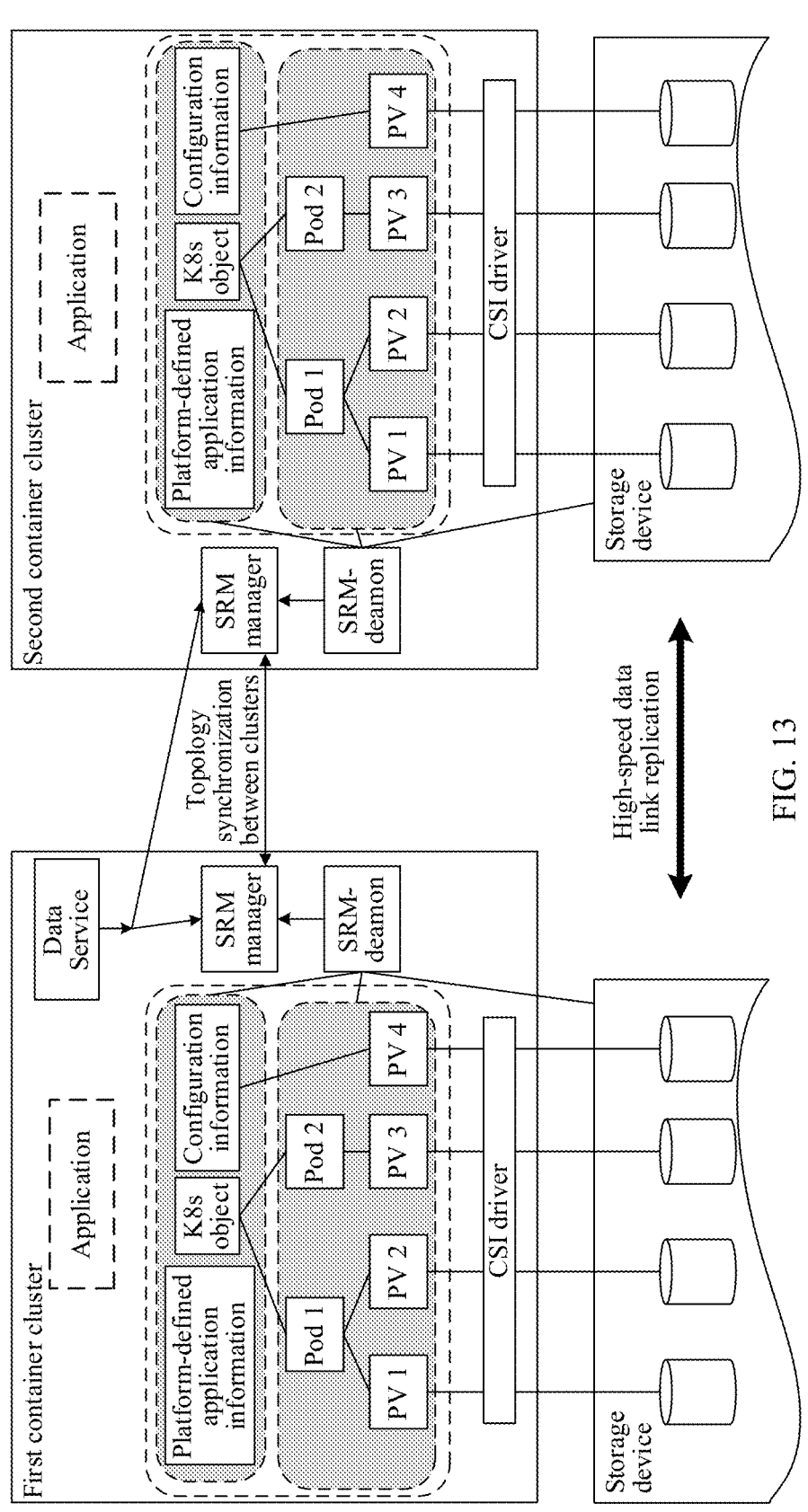
FIG. 13 is a schematic diagram of a running scenario of an application backup service according to an embodiment of this application.

FIG. 13 is a schematic diagram of a running scenario of an application backup service according to an embodiment of this application. An SRM-daemon in a first container cluster collects storage association information of an application in the first container cluster. An SRM manager in the first container cluster synchronizes a storage topology of the application in the first container cluster to a second container cluster, so that a storage topology of the application in the second container cluster is consistent with that in the first container cluster, thereby implementing the application backup in the first container cluster.

The foregoing describes the architecture, the apparatus, and the running scenario of embodiments of this application. The following describes the method in embodiments of this application in detail.

FIG. 14 is a schematic flowchart of a container storage management method according to an embodiment of this application. Optionally, the method may be applied to the foregoing container storage management apparatus, for example, the container storage management apparatus in the embodiment shown in FIG. 4 or FIG. 8.

The container storage management method shown in FIG. 14 may include one or more steps in step S1401 to step S1403. It should be understood that, for ease of description in this application, a sequence of S1401 to S1403 is used for description, and this is not intended to limit to perform execution in the foregoing sequence. An execution sequence, an execution time, a quantity of execution times, and the like of the foregoing one or more steps are not limited in this embodiment of this application.

Step S1401 to step S1403 are specifically as follows:

Step S1401: A container storage management apparatus collects a plurality of pieces of storage association information.

The container storage management apparatus is an apparatus that has a data collection function and a computing function, and is implemented by using hardware, software, or a combination of software and hardware.

Optionally, the container storage management apparatus may include a plurality of collection modules. The collection module is configured to implement a data collection function, for example, the collection module 402 shown in FIG. 4, or the SRM-daemon shown in FIG. 7.

The storage association information refers to information related to data storage of an application. Optionally, the storage association information may include one or more of the following: a single element of the application, an association between the element of the application and a physical storage location, a plurality of elements of the application, an association between the plurality of elements of the application, and the like.

For ease of understanding, the following exemplifies several possible designs of the storage association information.

Design 1: The storage association information includes a correspondence between a volume and an element other than the volume in an application. The volume is used to manage a storage resource that can be used by the application. The volume supports a plurality of types of backend storage, such as local storage and cloud storage. The local storage is, for example, one or more of an empty directory (emptyDir), a host address (HostPath), or the like. The cloud storage includes, for example, storage, file storage, and object storage.

In some scenarios, the cloud storage and/or the local storage may be used by using a PVC and a PV. Therefore, the correspondence between the volume and the element other than the volume in the application may include a relationship between the element other than the volume in the application and the PVC and/or the PV.

For example, the correspondence between the volume and the element other than the volume in the application may include one or more of the following ("-" represents an association relationship): application-PVC, Kubernetes object-PVC, Kubernetes object-SC, PVC-PV, PVC-SC, SC-PV, PV-CSI driver, SC-CSI driver, and the like.

"Application-PVC" includes a PVC directly defined at an application layer. "Kubernetes object-PVC" includes a PVC defined by a Kubernetes object in the application. Certainly, the Kubernetes object may include a plurality of pods and/or a plurality of containers. Therefore, the PVC defined by the Kubernetes object includes PVCs corresponding to the plurality of pods and/or the plurality of containers. "PVC-PV" indicates a PV bound to the PVC. "PV-SC" indicates a storage type corresponding to the PVC, and "SC-PV" indicates a storage type corresponding to the PV. A CSI driver is an invoking interface of a CSI to expose a storage device to a container cluster.

It should be understood that the storage-related information of the containerized application layer and the storage-related information of the container orchestration and scheduling layer that are shown in FIG. 9 in this embodiment of this application may include some information in the foregoing design 1. For example, the storage-related information of the containerized application layer includes "APP->PVC->PV", and the storage-related information of the container orchestration and scheduling layer includes an association relationship among the PV, the SC, and the CSI driver.

Design 2: The storage association information includes a correspondence between a volume and a physical storage location. Optionally, the physical storage location includes one or more of the following:

a logical unit number (LUN), a disk array (redundant array of independent disks, RAID) identifier, a disk identifier, a file system directory (Dir, also referred to as file directory, directory), a logical volume (LV) identifier, and the like.

The LUN is a logical unit number provided by the storage device, and is generally applicable to a storage device whose storage type is block storage. Specifically, when a container cluster uses a storage resource in the storage device, the storage device does not directly expose a storage space to the container cluster, but virtualizes the storage space into a logical unit (LU), and then provides the logical unit for the container cluster to use. Each logical unit has a unique logical unit number (LUN). Because the container cluster can directly sense the logical unit number, a person skilled in the art usually directly use the LUN to represent the logical unit. Each LUN has a LUN ID, which is used to identify the LUN. A specific physical location of data in the LUN may be determined by a start address and a length of the data. The start address is usually referred to as a logical block address (LBA) by a person skilled in the art. It may be understood that three factors, namely, the LUN ID, the LBA, and the length, identify a determined address segment, and one address segment may be indexed to one global address. Therefore, in some scenarios, the physical storage location may include the LUN ID, the LBA, and the length. Certainly, the foregoing uses LUN semantics as an example to describe the physical storage location. This application is also applicable to a case in which other mapping semantics are used.

The disk array identifier indicates a disk array on which data is stored. For example, the disk array identifier may be a disk array number, a disk array ID, or the like.

The disk identifier indicates a disk on which data is stored. For example, the disk identifier may be a disk number, a disk ID, or the like.

The file system directory indicates a directory on which data is stored. For example, the file system directory may be a folder path, a folder address, or the like.

The LV indicates a logical partition provided by the storage device. Specifically, the storage space of the storage device is provided by one or more hard disks. These hard disks may have only one partition, or may have a plurality of partitions. These existing physical partitions, that are, physical volumes (PV) are integrated, so that a partition group (or a volume group) (VG) is obtained. These PVs and/or the VG are/is logically allocated again to form a logical volume (LV). The storage device exposes the logical partition to the container cluster. The container cluster can use a lower-layer PV through the LV. Optionally, the PV, the VG, and the LV may be managed by a logical volume manager (LVM), to maintain a mapping relationship between the three.

For example, the storage device exposes the storage resource through the CSI. The correspondence between the volume and the physical storage location includes one or more of the following: CSI driver-LUN, CSI driver-LUN-disk array-disk, CSI driver-directory (Dir)-NAS file system, CSI driver-logical volume, CSI driver-logical volume-physical volume (PV) or volume group (VG), and the like.

The foregoing two designs are possible designs listed for ease of understanding the storage association information, and are not intended to limit content of the storage association information. In a specific implementation process, the storage association information may further include other designs, and details are not described herein.

It should be understood that the storage infrastructure layer shown in FIG. 9 provided in this embodiment of this application may include some information in the foregoing design 2. For example, the storage-related information of the storage infrastructure layer includes "CSI driver->LUN->RAID->disk".

Step S1402: The container storage management apparatus summarizes the plurality of pieces of storage association information to obtain a storage topology of an application.

Optionally, the container storage management apparatus includes a storage relationship management module, and step S1402 is specifically performed by the storage relationship management module. The storage relationship management module is, for example, the storage relationship management module 401 shown in FIG. 4 or the SRM manager shown in FIG. 8.

Optionally, the container storage management apparatus may determine an association relationship between an element of the application and another element and/or an association relationship between an element of the application and the physical storage location by using the plurality of pieces of storage association information, to obtain the storage topology of the application. For the storage topology of the application, refer to the foregoing related descriptions, for example, FIG. 5, FIG. 12, or FIG. 14.

In conclusion, in this embodiment of this application, the storage topology of the application can be collected and generated, and the container storage apparatus centrally manages and maintains storage topologies of applications. In addition, the collection module is deployed at a plurality of collection points, so that storage of the application can be collected in real time, and accuracy of the storage topology is higher.

In a possible solution, the storage association information collected by the container storage management apparatus may be in real time. When the storage association information changes, the storage topology of the application needs to be correspondingly updated. Specifically, the container storage management apparatus may collect the storage association information for a plurality of times, and update, based on the collected storage association information, a changed part of the storage association relationship. In this way, the container storage management apparatus may update the storage topology in a timely manner when the storage association relationship of the application changes, thereby improving timeliness and accuracy of the storage topology, and better meeting a user requirement. In addition, the container storage management apparatus updates only the changed part of the storage association relationship, but does not completely regenerate the storage topology, thereby greatly reducing running pressure of the container storage management apparatus and further improving efficiency of updating the storage topology.

Further, the storage topology of the application obtained by the container storage management apparatus may be provided for the data service, another container cluster, or the like. The following uses an example in which storage of the application is provided for the data service for description.

Step S1403 (optional): The container storage management apparatus responds to requests of a plurality of data services to separately provide the storage topology of the application to the plurality of data services.

Optionally, the container storage management apparatus may provide a service interface. In this case, the container storage management apparatus can respond to invoking of the service interface by the plurality of data services to separately provide the storage topology of the containerized application for the plurality of data services.

Optionally, in addition to providing the storage topology of the application through the service interface, the container storage management apparatus may also actively provide the storage topology of the application to the outside. As shown in FIG. 12 or FIG. 13, the container storage management apparatus may synchronize the storage topology of the application to the second container cluster.

In the embodiment shown in FIG. 14, the container storage management apparatus can collect the storage association information of the application, and summarize the plurality of pieces of storage association information to obtain the storage topology of the application, to centrally manage and maintain storage topologies of applications.

Further, the storage topology may be further provided for the data service. On one aspect, in a development or running process, an upper-layer data service can conveniently and quickly obtain a storage topology of a required application only by invoking the foregoing service interface, and does not need to obtain different storage information from a plurality of places in real time or summarize the storage information, so that a development and running process of each data service is simpler and more efficient, and an error is not likely to occur, thereby improving service efficiency and quality of service of the data service. On the other hand, in this embodiment of this application, storage topologies of applications can be centrally managed and maintained. To be specific, only the storage relationship management module needs to obtain and maintain the storage topologies of the applications, and each service does not need to perform such process, thereby avoiding repeated work of each data service, and further reducing consumption of computing resources in the container cluster.

Figure 15:
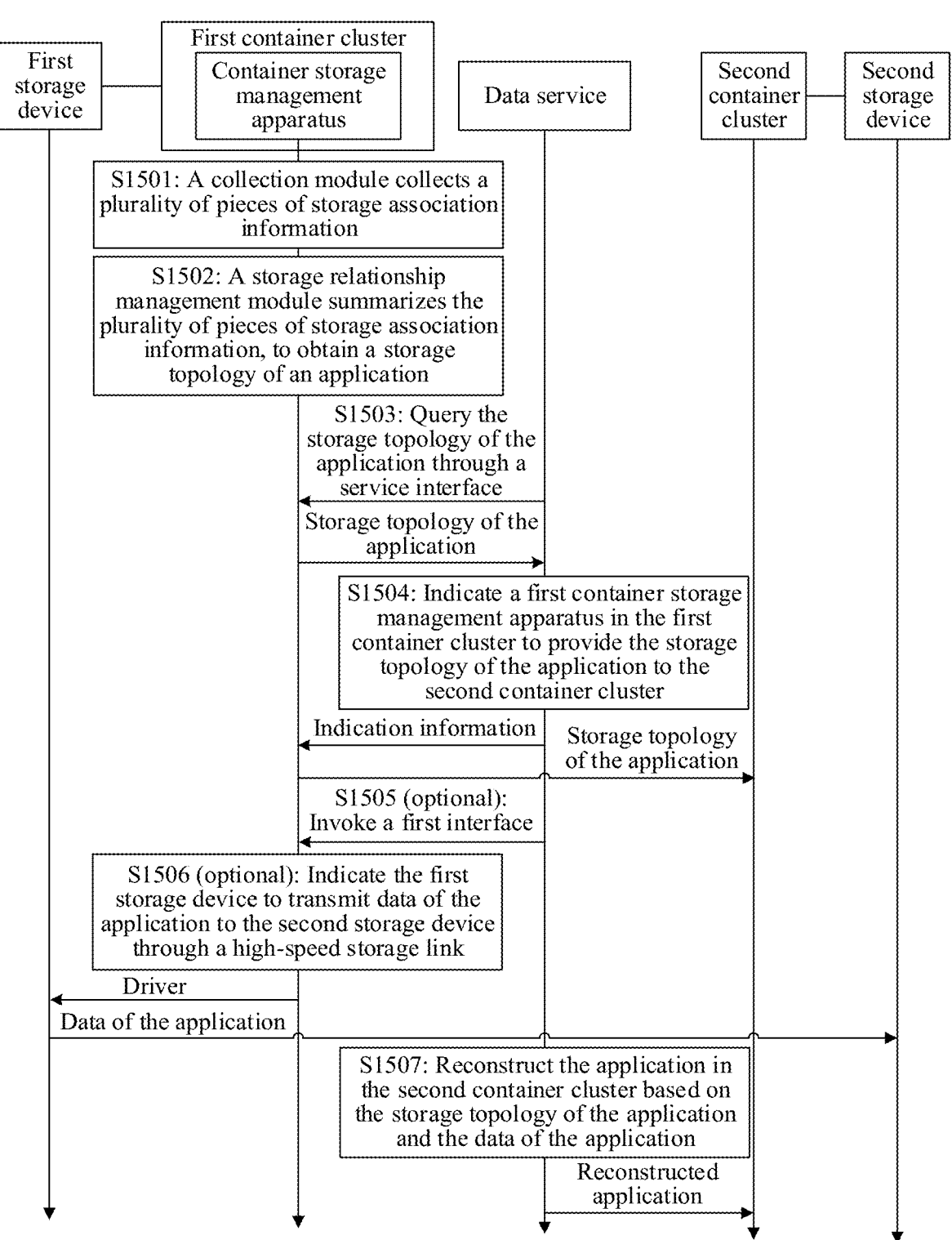
FIG. 15 is a schematic flowchart of still another container storage management method according to an embodiment of this application.

FIG. 15 is a schematic flowchart of still another container storage management method according to an embodiment of this application. Optionally, the method may be applied to a system including a plurality of container clusters, for example, the system shown in FIG. 11.

The container storage management method shown in FIG. 15 may include one or more steps in step S1501 to step S1507. It should be understood that, for ease of description, in this embodiment of this application, a sequence of S1501 to S1507 is used for description, and this is not intended to limit to perform execution in the foregoing sequence. An execution sequence, an execution time, a quantity of execution times, and the like of the foregoing one or more steps are not limited in this embodiment of this application. S1501 to S1507 are specifically as follows:

Step S1501: A container storage management apparatus in a first container cluster collects a plurality of pieces of storage association information.

Specifically, this step may be performed by a collection module in the container storage management apparatus.

The first container cluster is a container cluster used to orchestrate a container, or is referred to as a container platform or a container engine. The collection module may be deployed in the first container cluster, and the collection module may collect the plurality of pieces of storage association information.

For related descriptions, refer to the descriptions in step S1401.

Step S1502: The container storage management apparatus in the first container cluster summarizes the plurality of pieces of storage association information, to obtain a storage topology of an application.

Specifically, this step may be performed by a storage relationship management module in the container storage management apparatus.

For related descriptions, refer to the descriptions in step S1402.

Step S1503: A data service queries the storage topology of the application by invoking a service interface.

Correspondingly, the first container storage management apparatus responds to requests of a plurality of data services to separately provide the storage topology of the application for the data services.

For a manner in which the data service uses the obtained storage topology of the application, refer to the related description of step 3 in FIG. 12. Details are not described again.

Step S1504: The data service indicates the first container storage management apparatus in the first container cluster to provide the storage topology of the application to a second container cluster.

For example, the data service may send indication information to the first container storage management apparatus. Correspondingly, the first container storage management apparatus provides the storage topology of the application to the second container cluster based on the indication information. The storage topology is used to deploy the application in the second container cluster.

The foregoing is merely an example description. An indication manner and a format of the indication information are not limited in this application. For example, the indication information may be a control signal, a computer instruction, or the like.

In a possible design, a second container storage management apparatus is deployed in the second container cluster. The first container storage management apparatus may provide the storage topology of the application to the second container storage management apparatus in the second container cluster.

It should be understood that a second storage relationship management apparatus in the first container cluster and a second storage relationship management apparatus in the second container cluster may be the same or different during implementation.

Further, optionally, the first container storage management apparatus includes a first SRM manager, and the second container storage management apparatus includes a second SRM manager. In this case, step S1504 may be: The data service indicates the first SRM manager to provide the storage topology of the application to the second SRM manager.

Step S1505 (optional): The data service invokes a first interface.

Specifically, the container storage management apparatus provides the first interface, and the data service may use a storage function provided by the storage device by invoking the first interface.

Herein, optionally, it may be understood that, in a specific implementation process, the data service may not invoke the first interface. For example, in an application migration process, a device on the storage device may not need to be migrated. In this case, the storage function of the storage device may not need to be invoked. For another example, the data service may directly invoke the storage function of the storage device by invoking a private interface of the storage device.

The following uses an example in which the storage function is a high-speed storage link for description.

Step S1506 (optional): The container storage management apparatus indicates a first storage device to transmit data of the application to a second storage device through the high-speed storage link.

The indication herein may be sent indication information, or may be implemented by using a driver.

In a specific embodiment, the container storage management apparatus responds to invoking of the first interface by the data service to drive the first storage device connected to the first container cluster to transmit the data of the containerized application to the second storage device connected to the second container cluster. For related content, refer to the description of step 4 in FIG. 12. Details are not described again.

Herein, optionally, it may be understood that step S1506 may not be performed in a specific implementation process.

For example, in an application migration process, a device on the storage device may not need to be migrated. In this case, the storage function of the storage device may not need to be invoked.

Step S1507: The data service reconstructs the application in the second container cluster based on the storage topology of the application and the data of the application.

In this way, the application may be deployed in the second container cluster, to implement any data service of migration, backup, active-active, or disaster recovery of the application.

In a specific embodiment, in the application migration scenario, the data service may create a migration task, and a migration module is established in the second container cluster for the migration task. The migration module of the second container cluster completes reconstruction of the application in the second container cluster based on the storage topology and the data of the application that is transmitted to the second storage device in step S1506.

Optionally, the storage topology of the application used in step S1507 may be obtained by the data service from the first SRM manager, or may be obtained from the second SRM manager. For related content, refer to the description of step 5 in FIG. 12. Details are not described again.

In the foregoing embodiment, an example in which the data of the application has been migrated to the second storage device is used. Certainly, in some scenarios, although the application needs to be migrated to the second container cluster, a storage device connected to the second container cluster may still be the first storage device. In this case, the data of the application may be stored in the first storage device, and the data service may complete reconstruction of the application in the second container cluster based on the storage topology of the application and the data of the application in the first storage device.

In the embodiment shown in FIG. 15, the container storage management apparatus centrally manages storage topologies of applications, so that invoking, development, and maintenance of an upper-layer data service are simpler, an error probability is reduced, and reliability is improved. In addition, storage collected by the container storage management apparatus is collected in real time by the background. Therefore, the data service can quickly obtain the storage topology of the application by using the container storage management apparatus, efficiency is higher, and accuracy of the storage topology is higher.

In a possible design, the function implemented by the data service is separately implemented by a plurality of sub-services. These sub-services may be distributed on different devices, and collaborate to implement the function implemented by the data service. Specifically, the sub-service may be considered as a function module of the data service, and may be implemented by using software, instructions, a process, or the like. For related descriptions, refer to the descriptions shown in FIG. 11.

Figure 16:
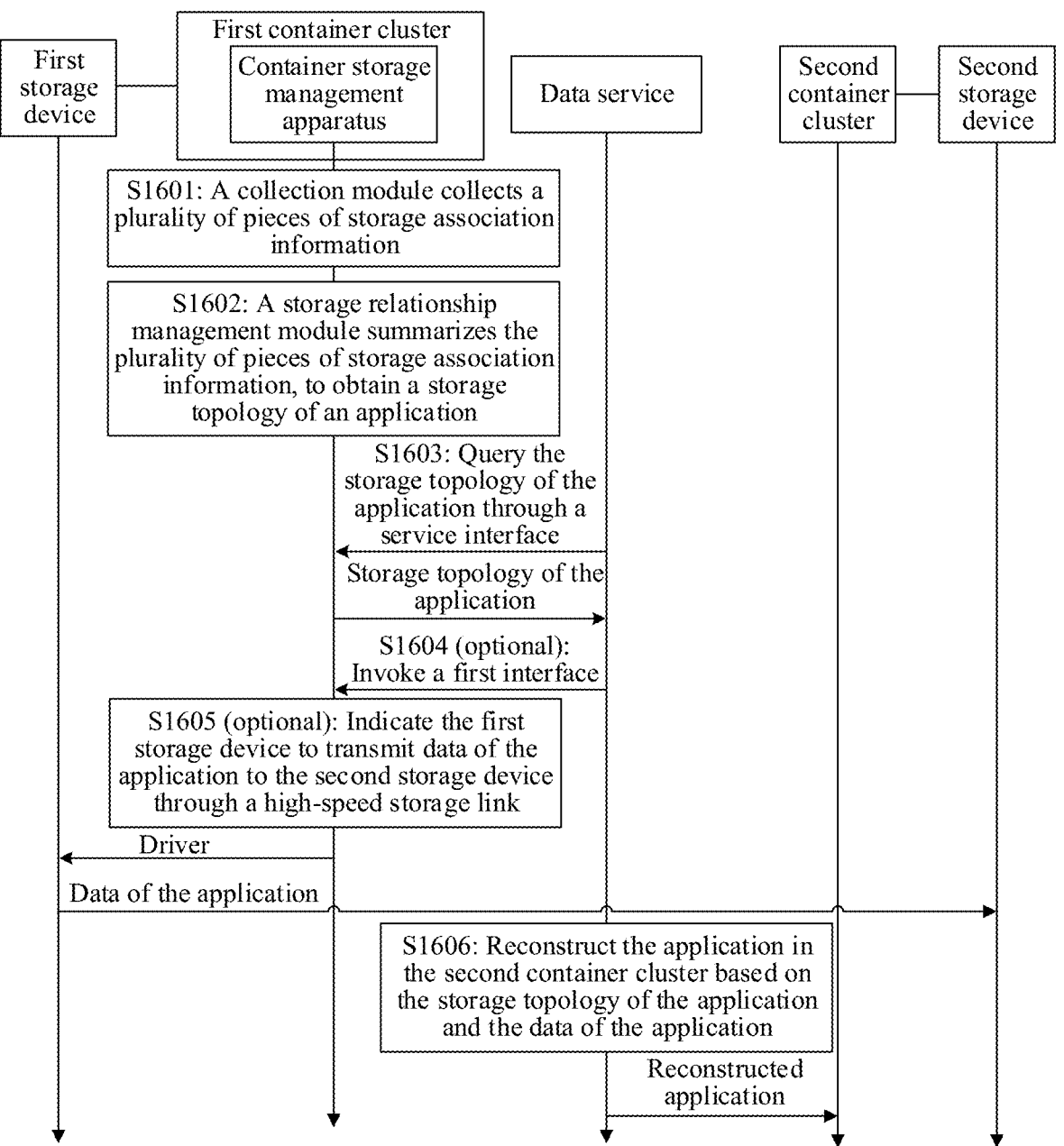
FIG. 16 is a schematic flowchart of a container storage management method according to an embodiment of this application.

FIG. 16 is a schematic flowchart of still another container storage management method according to an embodiment of this application. Optionally, the method may be applied to the foregoing system, for example, the system shown in FIG. 11 or FIG. 12.

The container storage management method shown in FIG. 16 may include one or more steps in step S1601 to step S1606. It should be understood that, for ease of description, in this application, a sequence of S1601 to S1606 is used for description, and this is not intended to limit to perform in the foregoing sequence. An execution sequence, an execution time, a quantity of execution times, and the like of the foregoing one or more steps are not limited in this embodiment of this application. S1601 to S1606 are specifically as follows:

Step S1601: A container storage management apparatus in a first container cluster collects a plurality of pieces of storage association information.

For related descriptions, refer to the descriptions in step S1501.

Step S1602: The container storage management apparatus in the first container cluster summarizes the plurality of pieces of storage association information, to obtain a storage topology of an application.

For related descriptions, refer to the descriptions in step S1502.

Step S1603: A data service queries the storage topology of the application through a service interface.

For details, refer to the related description of S1503. Details are not described again.

Step S1604 (optional): The data service invokes a first interface. For details, refer to the related description of S1505. Details are not described again.

Step S1605 (optional): The container storage management apparatus indicates a first storage device to transmit data of the application to a second storage device through a high-speed storage link.

For details, refer to the related description of S1506. Details are not described again.

Step S1606: The data service reconstructs the application in a second container cluster based on the storage topology of the application and the data of the application.

In this way, the data service may deploy the application in the second container cluster, to implement any data service of migration, backup, active-active, or disaster recovery of the application.

In a specific embodiment, in the application migration scenario, the data service may create a migration task, and a migration module is established in the second container cluster for the migration task. The migration module completes reconstruction of the application in the second container cluster based on the storage topology and the data transmitted to the second storage device in step S1605.

With reference to FIG. 11, the first sub-service in the data service is used to perform one or more steps of step S1603, step S1604, or the like. The second sub-service in the data service is used to perform the step performed by the data service in the second container cluster. For example, the second sub-service is configured to perform one or more steps in step S1606 and the like.

In the embodiment shown in FIG. 16, the container storage management apparatus centrally manages storage topologies of applications, so that invoking, development, and maintenance of an upper-layer data service are simpler, an error probability is reduced, and reliability is improved. In addition, storage collected by the container storage management apparatus is collected in real time by the background. Therefore, the data service can quickly obtain the storage topology of the application by using the container storage management apparatus, efficiency is higher, and accuracy of the storage topology is higher.

An embodiment of this application further provides a service providing system. The service providing system includes a first container storage management apparatus, and the service providing system further provides a plurality of data services. The first container storage management apparatus is the foregoing container storage apparatus, for example, the container storage management apparatus in the embodiment shown in FIG. 4 or FIG. 8. The service providing system is configured to implement the foregoing container storage management method, for example, the container storage management method in the embodiment shown in FIG. 14, FIG. 15, or FIG. 16.

In a possible implementation, the first container storage management apparatus is located in a first container cluster, and an application is deployed in the first container cluster.

The first data service includes a first sub-service and a second sub-service, the first sub-service is located in a second container cluster, and the second sub-service is located in the first container cluster.

The first sub-service is used to reconstruct the container-ized application in the second container cluster based on a storage topology of the containerized application and data that is of the containerized application and that is stored in a second storage device, where the second storage device is connected to the second container cluster.

In a possible implementation, the first container storage management apparatus is further configured to synchronize the storage topology of the containerized application to a second container storage management apparatus in the second container cluster.

The first sub-service is further configured to invoke a service interface provided by the second container storage management apparatus to obtain the storage topology of the containerized application.

In a possible implementation, the first data service further includes a second sub-service, and the second sub-service is located in the first container cluster. The second sub-service is configured to invoke a service interface provided by the first container storage management apparatus to obtain the storage topology of the containerized application, and syn-chronize the storage topology of the containerized applica-tion to the first sub-service.

An embodiment of this application further provides a service providing system. The service providing system includes a first container cluster, the first container cluster includes a plurality of first nodes, and a containerized application is deployed in the first container cluster. The first container cluster stores first computer programs or instruc-tions, and the first computer programs or instructions are loaded and executed by the first node, so that the first container cluster implements the foregoing container storage management method, for example, the container storage management method in embodiments such as FIG. 13, FIG. 14, or FIG. 16.

In a possible implementation, the system further includes a second container cluster, the second container cluster includes a plurality of second nodes. The second container cluster stores second computer programs or instructions, and the second computer programs or instructions are loaded and executed by the second node, so that the second container cluster implements the method performed by the second container cluster and/or the method performed by the first sub-service in the data service in the foregoing embodiment.

When the first computer programs or instructions are loaded and executed by the first node, the first container cluster further performs the method performed by the first container storage management apparatus and/or the second sub-service in the data service in the foregoing embodiment.

Alternatively, the container cluster in the foregoing instance may be Kubernetes®. Alternatively, optionally, the container cluster in the foregoing embodiment may be replaced with another computing instance cluster, for example, a virtual machine cluster or a bare metal server cluster.

An embodiment of this application further provides a storage relationship management apparatus. The storage relationship management apparatus includes a storage rela-tionship management module. The storage relationship man-agement module is configured to implement one or more functions of summarizing storage association information, obtaining a storage topology, or providing a service interface in the foregoing embodiments. For details, refer to the description in the foregoing embodiment.

Optionally, the storage relationship management module may include a communication unit and a processing unit. The communication unit is configured to receive and/or send data (for example, implement a function of receiving, or summarizing storage association information), and/or the communication unit is configured to provide input and/or output for the processor. The processing unit is configured to implement functions such as processing, generating, and calculating. An embodiment of this application further pro-vides a collection apparatus. The collection apparatus includes a collection module. The collection module is configured to implement one or more functions of collecting association information, reporting storage association infor-mation, and the like in the foregoing embodiments. For details, refer to the description in the foregoing embodiment.

Optionally, the collection module may include a collec-tion unit and a communication unit. The collection unit is configured to collect data. The communication unit is con-figured to receive and/or send data (for example, implement a function of reporting storage association information), and/or the communication unit is configured to provide input and/or output for the processor.

Optionally, the collection module further includes a pro-cessing unit. The processing unit is configured to preprocess the collected data and the like.

This application further provides a computing device 170. The computing device is a device having a computing capability. The device herein may be a physical device, for example, a node, a server (for example, a rack server), or a host, or may be a virtual device, for example, a virtual machine or a container.

Figure 17:
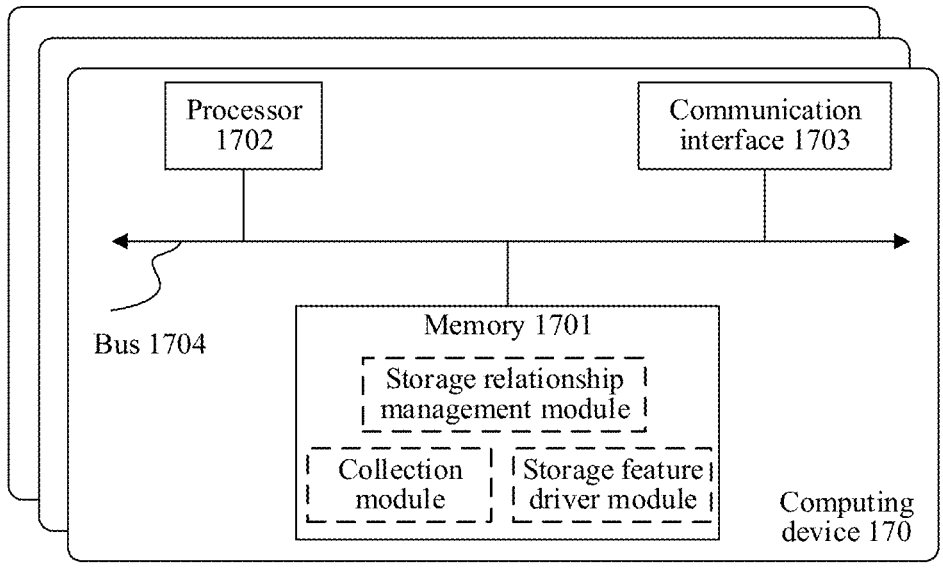
FIG. 17 is a schematic diagram of a structure of a computing device according to an embodiment of this application.

As shown in FIG. 17, the computing device 170 includes a processor 1702, a memory 1701, and a bus 1704, and optionally includes a communication interface 1703. The processor 1702 communicates with the memory 1701 and the like through the bus 1704. It should be understood that quantities of processors and memories in the computing device 170 are not limited in this application.

The memory 1701 is configured to provide a storage space. The storage space may optionally store application data, user data, an operating system, computer programs, and the like. The memory 1701 may include a volatile memory, for example, a random access memory (RAM). The memory 1701 may further include a non-volatile memory, for example, a read-only memory (ROM), a flash memory, a hard disk drive (HDD), or a solid state drive (SSD).

The processor 1702 is a module for performing an opera-tion, and may include any one or more of processors such as a central processing unit (CPU), a graphics processing unit (GPU), a microprocessor (MP), a digital signal processor (DSP), a coprocessor (assisting the central processing unit in completing corresponding processing and application), an application-specific integrated circuit (ASIC), and a micro control unit (MCU).

The communication interface 1703 is configured to pro-vide information input or output for the at least one proces-sor, and/or the communication interface 1703 may be configured to receive data sent from the outside and/or send data to the outside. The communication interface 1703 may be a wired link interface including, for example, an Ethernet cable, or may be a wireless link (Wi-Fi, Bluetooth, universal wireless transmission, or another wireless communication technology) interface. Optionally, the communication interface 1703 may further include a transmitter (for example, a radio frequency transmitter, an antenna, and the like), a receiver, or the like that is coupled to the interface.

The bus 1704 may be a peripheral component interconnect (PCI) bus, an extended industry standard architecture (EISA) bus, or the like. Buses may be classified into an address bus, a data bus, a control bus, and the like. To facilitate illustration, only one line is used in FIG. 17 to represent the bus, but it does not indicate that there is only one bus or only one type of bus. The bus 1704 may include a path for transmitting information between components (for example, the memory 1701, the processor 1702, and the communication interface 1703) of the computing device 170.

In this embodiment of this application, the memory 1701 stores executable instructions, and the processor 1702 executes the executable instructions to implement the foregoing container storage management method, for example, the container storage management method in the embodiment such as FIG. 13, FIG. 14, or FIG. 16. In other words, the memory 1701 stores instructions used to perform the container storage management method.

Alternatively, the memory 1701 stores executable instructions, and the processor 1702 executes the executable instructions to separately implement functions of one or more of the foregoing storage relationship management module, collection module, storage feature driver module, and the like, to implement the container storage management method.

An embodiment of this application further provides a computing device cluster. The computing device cluster includes at least one computing device 170. The computing device may be a server, for example, a central server, an edge server, or a local server in a local data center. In some embodiments, the computing device may also be a terminal device, for example, a desktop computer, a notebook computer, or a smartphone.

As shown in FIG. 17, the computing device cluster includes at least one computing device 170. The memory 1701 in one or more computing devices 170 in the computing device cluster may store same instructions used to perform the container storage management method.

In some possible implementations, the memory 1701 of the one or more computing devices 170 in the computing device cluster may also separately store some instructions used to perform the container storage management method. In other words, a combination of the one or more computing devices 170 may jointly execute instructions used to perform the container storage management method.

It should be noted that the memories 1701 in different computing devices 170 in the computing device cluster may store different instructions, and are respectively used to execute some functions of the container storage relationship apparatus. In other words, instructions stored in the memories 1701 in different computing devices 170 may implement a function of one or more modules (or apparatuses) in the storage relationship management module, the collection module, the storage feature driver, or the data service (not shown in FIG. 17).

In some possible implementations, the one or more computing devices in the computing device cluster may be connected through a network. The network may be a wide area network, a local area network, or the like.

An embodiment of this application further provides a computer program product including instructions. The computer program product may be a software or program product that includes instructions and that can run on a computing device or be stored in any usable medium. The computer program instructions are used to implement the foregoing container storage management method, for example, the container storage management method in the embodiment in FIG. 13, FIG. 14, or FIG. 16.

Embodiments of this application further provide a computer-readable storage medium. The computer-readable storage medium includes instructions, and the instructions are used to implement the foregoing container storage management method, for example, the container storage management method in the embodiment in FIG. 13, FIG. 14, or FIG. 16.

The computer-readable storage medium may be any usable medium that can be stored by a computing device, or a data storage device such as a data center including one or more usable media. The usable medium may be a magnetic medium (for example, a floppy disk, a hard disk, or a magnetic tape), an optical medium (for example, a DVD), a semiconductor medium (for example, a solid-state drive), or the like.

In embodiments of this application, the terms such as "example" or "for example" are used to represent giving an example, an illustration, or a description. Any embodiment or design scheme described as an "example" or "for example" in this application should not be explained as being more preferred or having more advantages than another embodiment or design scheme. Exactly, use of the term "example", "for example", or the like is intended to present a related concept in a specific manner.

In embodiments of this application, "at least one" means one or more, and "a plurality of" means two or more. At least one of the following items (pieces) or a similar expression thereof refers to any combination of these items, including any combination of singular items (pieces) or plural items (pieces). For example, at least one of a, b, or c may indicate: a, b, c, (a and b), (a and c), (b and c), or (a, b, and c), where a, b, and c may be singular or plural. The term "and/or" describes an association between associated objects, and indicates that three relationships may exist. For example, A and/or B may indicate the following three cases: Only A exists, both A and B exist, and only B exists, where A and B may be singular or plural. The character "/" generally indicates an "or" relationship between the associated objects.

In addition, unless otherwise stated, ordinal numbers such as "first" and "second" in embodiments of this application are for differentiation between a plurality of objects, but are not intended to limit an order, a time sequence, priorities, or importance of the plurality of objects. For example, the first container storage management apparatus and the second container storage management apparatus are merely for ease of description, but do not indicate differences in apparatus structures, deployment sequences, importance degrees, and the like of the first container storage management apparatus and the first container storage management apparatus.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of the present invention.

The invention claimed is:

1. A container storage management method, wherein the container storage management method is used to manage a containerized application, the containerized application is deployed in a first container cluster, the first container cluster comprises a plurality of nodes, and the method comprises:

collecting, by a container storage management apparatus in the first container cluster, a plurality of pieces of storage association information from the plurality of nodes in the first container cluster, wherein the storage association information is information related to data storage of the containerized application;

summarizing, by the container storage management apparatus, the plurality of pieces of storage association information to obtain a storage topology of the containerized application, wherein the storage topology of the containerized application comprises an association between an element of the containerized application and a physical storage location of the containerized application, the physical storage location is a location at which a first storage device stores data of the containerized application, and the first storage device is connected to the first container cluster; and responding, by the container storage management apparatus, to requests of a plurality of data services to separately provide the storage topology of the containerized application to the plurality of data services.

2. The method according to claim 1, wherein the container storage management apparatus further provides a service interface, and the responding to requests of a plurality of data services comprises:

responding to invoking of the service interface by the plurality of data services to separately provide the storage topology of the containerized application to the plurality of data services.

3. The method according to claim 1, wherein the storage topology of the containerized application is used by the plurality of data services to implement at least one of migration, backup, active-active, or disaster recovery of the containerized application.

4. The method according to claim 1, wherein the storage association information comprises at least one of a correspondence between the containerized application and a volume, or a correspondence between a volume used by the containerized application and the physical storage location.

5. The method according to claim 4, wherein the correspondence between the containerized application and the volume comprises one or more of the following:

a persistent volume (PV) corresponding to a persistent volume claim (PVC) defined by the containerized application, a storage class (SC) corresponding to the PVC, and an SC corresponding to the PV.

6. The method according to claim 2, wherein the container storage management apparatus further provides a first interface, and the first interface is configured to invoke a storage function provided by the first storage device.

7. The method according to claim 6, wherein the storage function comprises a high-speed storage link, and the method further comprises:

responding to invoking of the first interface by one of the plurality of data services to indicate the first storage device to transmit the data of the containerized application to a second storage device through the high-speed storage link.

8. The method according to claim 7, wherein the plurality of data services comprise a first data service, the first data service comprises a first sub-service, the first sub-service is located in a second container cluster, and the method further comprises:

reconstructing, by the first sub-service, the containerized application in the second container cluster based on the storage topology of the containerized application and the data that is of the containerized application and that is stored in the second storage device, wherein the second storage device is connected to the second container cluster.

9. The method according to claim 8, wherein the method further comprises:

synchronizing the storage topology of the containerized application to the second container cluster; and obtaining, by the first sub-service, the storage topology of the containerized application from the second container cluster.

10. The method according to claim 8, wherein the first data service further comprises a second sub-service, the second sub-service is located in the first container cluster, and the method further comprises:

invoking, by the second sub-service, the service interface to obtain the storage topology of the containerized application; and synchronizing, by the second sub-service, the storage topology of the containerized application to the first sub-service.

11. A container storage management apparatus, wherein the apparatus is configured to manage a containerized application, the containerized application is deployed in a first container cluster, the first container cluster comprises a plurality of nodes and the apparatus, and the container storage management apparatus comprises:

at least one processor; and at least one memory coupled to the at least one processor, wherein the at least one memory stores program instructions for execution by the at least one processor to cause the container storage management apparatus to perform operations comprising:

collecting a plurality of pieces of storage association information from the plurality of nodes in the first container cluster, wherein the storage association information is information related to data storage of the containerized application;

summarizing the plurality of pieces of storage association information to obtain a storage topology of the containerized application, wherein the storage topology of the containerized application comprises an association between an element of the containerized application and a physical storage location of the containerized application, the physical storage location is a location at which a first storage device stores data of the containerized application, and the first storage device is connected to the first container cluster; and responding to requests of a plurality of data services to separately provide the storage topology of the containerized application to the plurality of data services.

12. The apparatus according to claim 11, wherein the container storage management apparatus further provides a service interface, and the responding to requests of a plurality of data services comprises:

responding to invoking of the service interface by the plurality of data services to separately provide the storage topology of the containerized application to the plurality of data services.

13. The apparatus according to claim 11, wherein the storage topology of the containerized application is used by the plurality of data services to implement at least one of migration, backup, active-active, or disaster recovery of the containerized application.

14. The apparatus according to claim 11, wherein the storage association information comprises at least one of a correspondence between the containerized application and a volume, or a correspondence between a volume used by the containerized application and the physical storage location.

15. The apparatus according to claim 14, wherein the correspondence between the containerized application and the volume comprises one or more of the following:

a persistent volume (PV) corresponding to a persistent volume claim (PVC) defined by the containerized application, a storage class (SC) corresponding to the PVC, and an SC corresponding to the PV.

16. The apparatus according to claim 12, wherein the apparatus further provides a first interface, and the first interface is configured to invoke a storage function provided by the first storage device.

17. The apparatus according to claim 16, wherein the storage function comprises a high-speed storage link, and the operations further comprises:

responding to invoking of the first interface by one of the plurality of data services to indicate the first storage device to transmit the data of the containerized application to a second storage device through the high-speed storage link.

18. The apparatus according to claim 17, wherein the plurality of data services comprise a first data service, the first data service comprises a first sub-service, the first sub-service is located in a second container cluster, and the operations further comprises:

reconstructing, by the first sub-service, the containerized application in the second container cluster based on the storage topology of the containerized application and the data that is of the containerized application and that is stored in the second storage device, wherein the second storage device is connected to the second container cluster.

19. The apparatus according to claim 18, wherein the operations further comprises:

synchronizing the storage topology of the containerized application to the second container cluster; and obtaining, by the first sub-service, the storage topology of the containerized application from the second container cluster.

20. A non-transitory computer-readable storage medium having instructions stored thereon which, when executed by an apparatus in a first container cluster, cause the apparatus to perform operations comprising:

collecting a plurality of pieces of storage association information from a plurality of nodes in the first container cluster, wherein the storage association information is information related to data storage of a containerized application, the apparatus is used to manage the containerized application, and the containerized application is deployed in the first container cluster;

summarizing the plurality of pieces of storage association information to obtain a storage topology of the containerized application, wherein the storage topology of the containerized application comprises an association between an element of the containerized application and a physical storage location of the containerized application, the physical storage location is a location at which a first storage device stores data of the containerized application, and the first storage device is connected to a first container cluster; and responding to requests of a plurality of data services to separately provide the storage topology of the containerized application to the plurality of data services.

\* \* \* \* \*